(12) United States Patent
Takahashi et al.

(10) Patent No.: US 7,781,096 B2
(45) Date of Patent: Aug. 24, 2010

(54) BATTERY CASE

(75) Inventors: Atsushi Takahashi, Aichi (JP); Toshio Takeshita, Kanagawa (JP); Hideki Kamiya, Aichi (JP); Yoichi Miyajima, Tokyo (JP)

(73) Assignee: Sony Corporation, Tokyo (JP)

( * ) Notice: Subject to any disclaimer, the term of this patent is extended or adjusted under 35 U.S.C. 154(b) by 328 days.

(21) Appl. No.: 11/722,125

(22) PCT Filed: Nov. 4, 2005

(86) PCT No.: PCT/JP2005/020683

§ 371 (c)(1),
(2), (4) Date: Oct. 12, 2007

(87) PCT Pub. No.: WO2006/067919

PCT Pub. Date: Jun. 29, 2006

(65) Prior Publication Data

US 2009/0098452 A1    Apr. 16, 2009

(30) Foreign Application Priority Data

Dec. 20, 2004   (JP)   ............................. 2004-367325

(51) Int. Cl.
*H01M 2/08* (2006.01)
(52) U.S. Cl. .................. 429/162; 429/176; 429/185
(58) Field of Classification Search .................. 429/96, 429/159, 162, 176, 185
See application file for complete search history.

(56) References Cited

U.S. PATENT DOCUMENTS

| 5,180,644 | A | * | 1/1993 | Bresin et al. ............ 429/159 X |
| 5,563,005 | A | * | 10/1996 | Ohtani et al. ................. 429/96 |
| 5,598,964 | A | | 2/1997 | Gore et al. ..................... 228/1.1 |
| 6,924,059 | B1 | * | 8/2005 | Kawakami et al. .......... 429/162 |
| 2004/0070366 | A1 | | 4/2004 | Takeshita et al. ............. 320/107 |
| 2004/0126657 | A1 | * | 7/2004 | Chung ......................... 429/185 |
| 2008/0096100 | A1 | | 4/2008 | Hagiwara et al. | |

FOREIGN PATENT DOCUMENTS

| EP | 1 353 389 | 10/2003 |
| JP | 63 259962 | 10/1988 |
| JP | 2002 245993 | 8/2002 |

* cited by examiner

*Primary Examiner*—Stephen J. Kalafut
(74) *Attorney, Agent, or Firm*—Oblon, Spivak, McClelland, Maier & Neustadt, L.L.P.

(57) ABSTRACT

The present invention provides a battery including a case and a battery cell accommodated in the case. The case is divided in a thicknesswise direction of the battery cell into a first case and a second case. The first and second cases have joint portions formed along peripheries thereof for jointing with each other. The joint portion of one of the first and second cases has a joining thin wall formed to extend along a periphery thereof and project in the thicknesswise direction. The joint portion of the other of the first and second cases has a joining recess formed to extend along a periphery thereof for receiving the joining thin wall inserted therein in a state that the joint portions of the first and second cases joint with each other. The joining thin wall and the joining recess in which the joining thin wall is inserted while the joint portions of the first and second cases joint with each other are joined together by welding. The other case has a projecting wall formed at a location of an outer face thereof positioned on the outer side of the joining recess in such a manner as to extend along the joining recess.

8 Claims, 37 Drawing Sheets

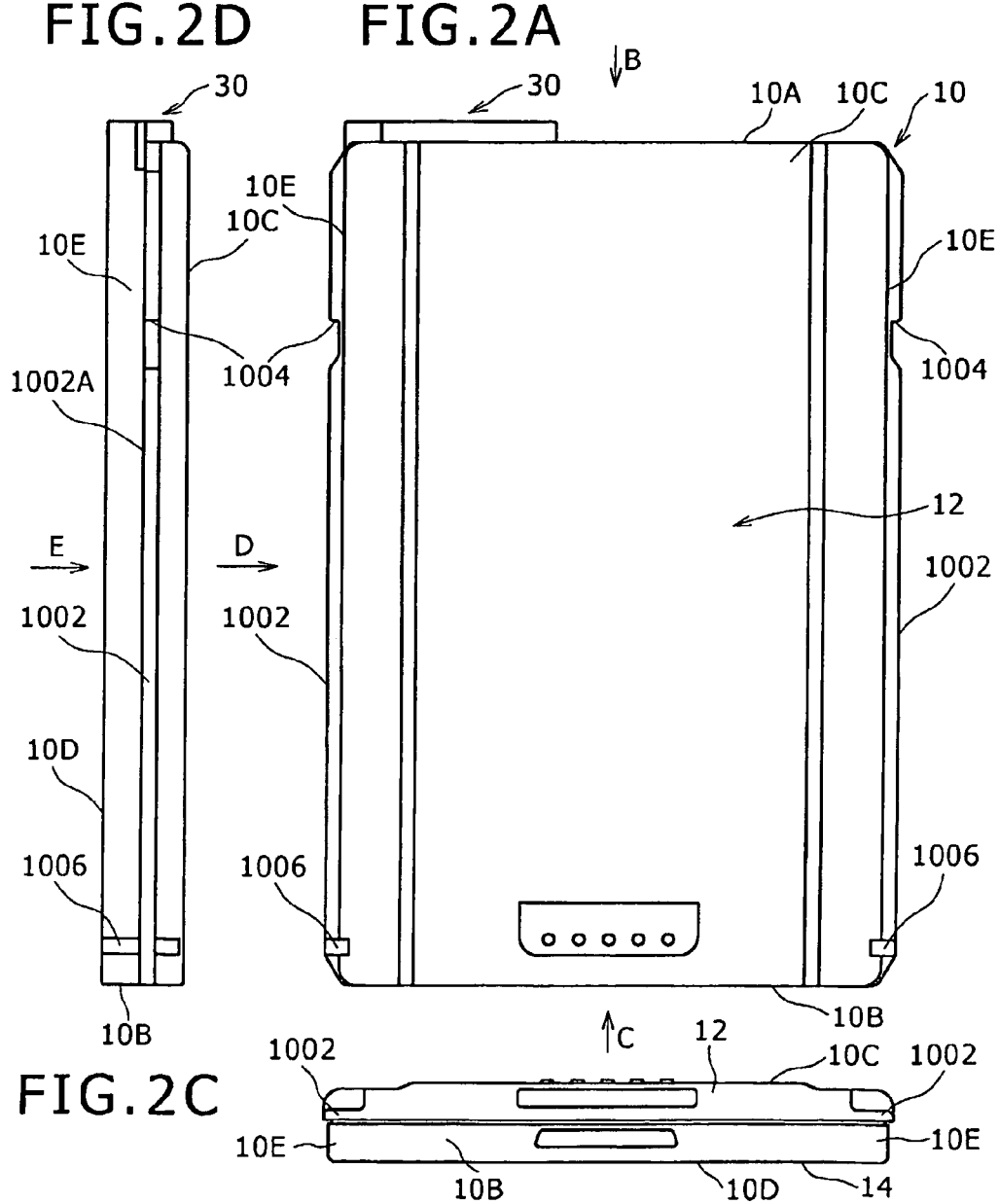

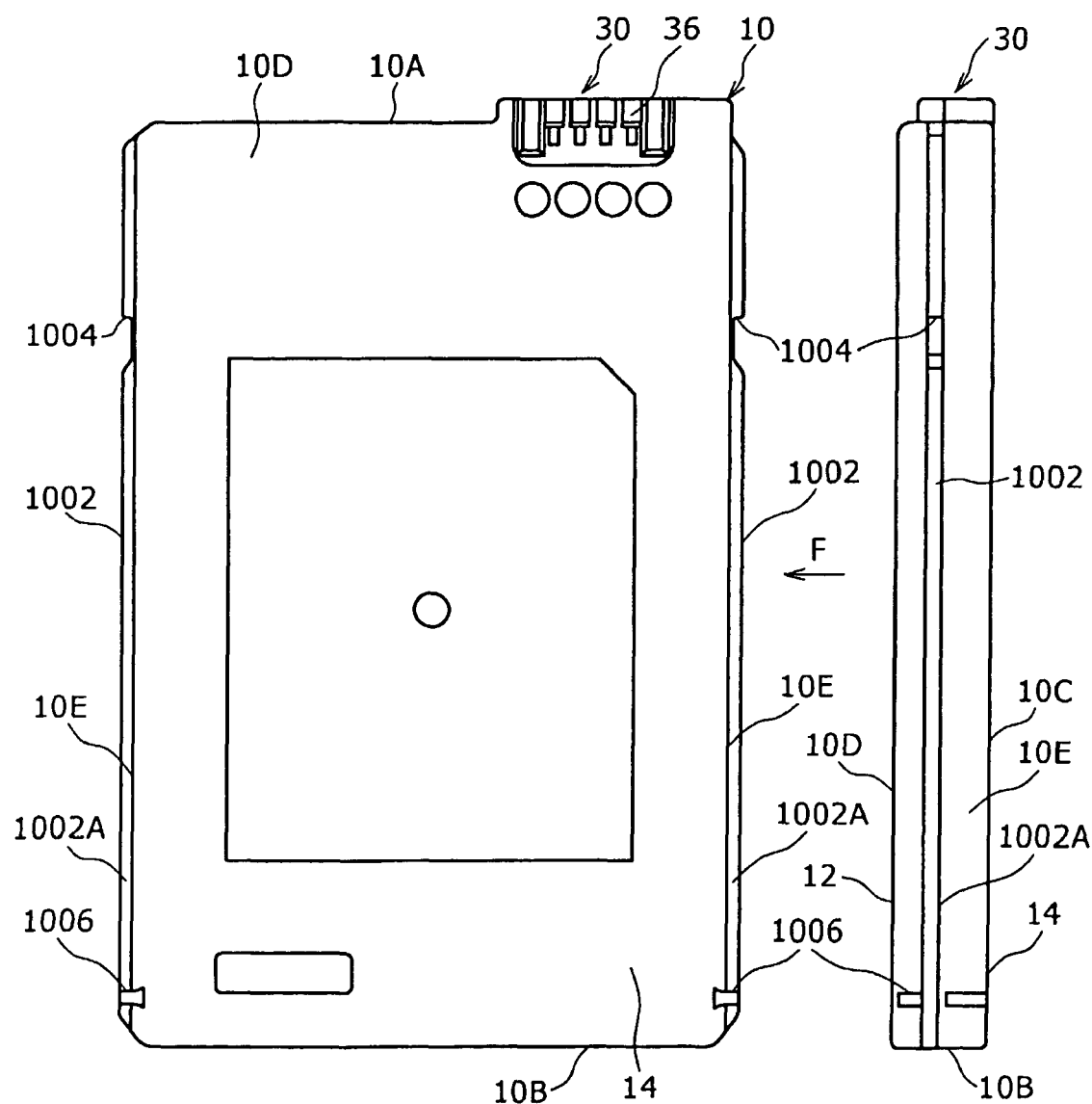

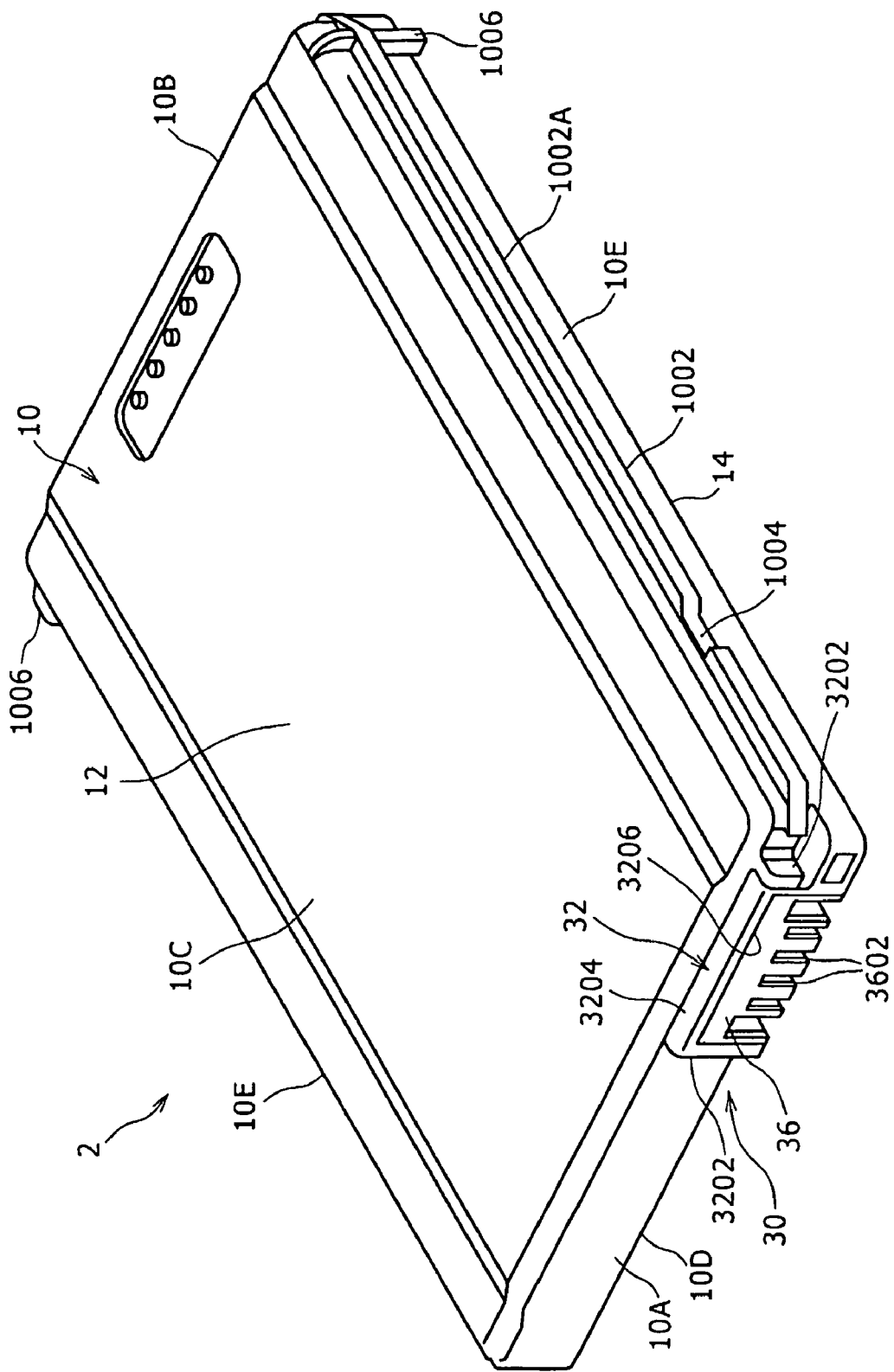

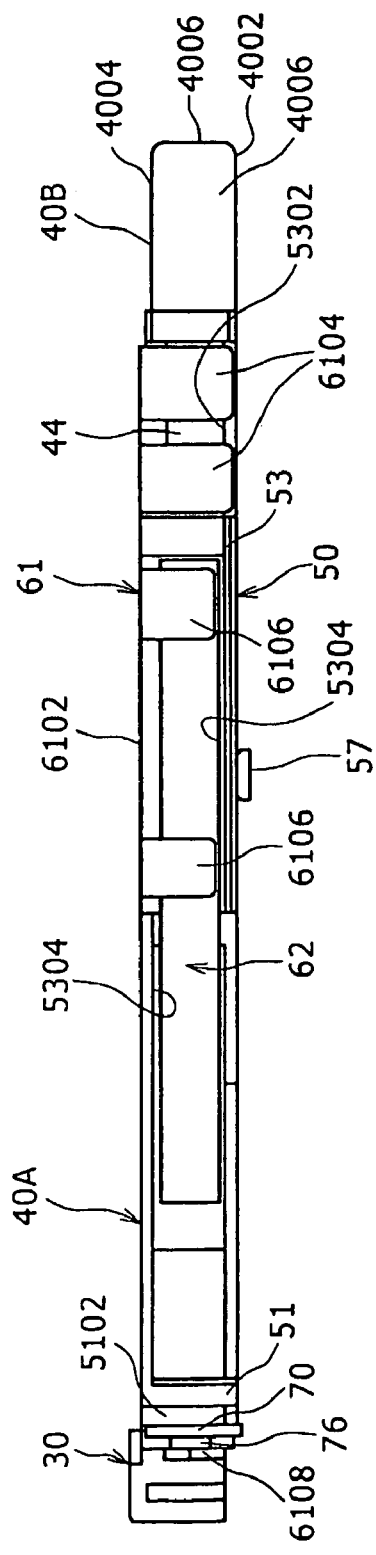
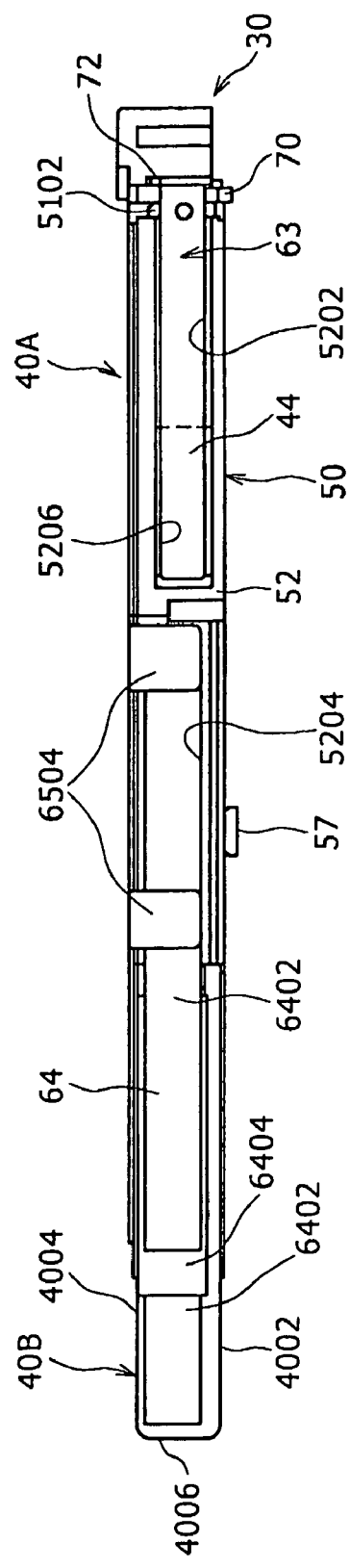
FIG.14A
FIG.14B

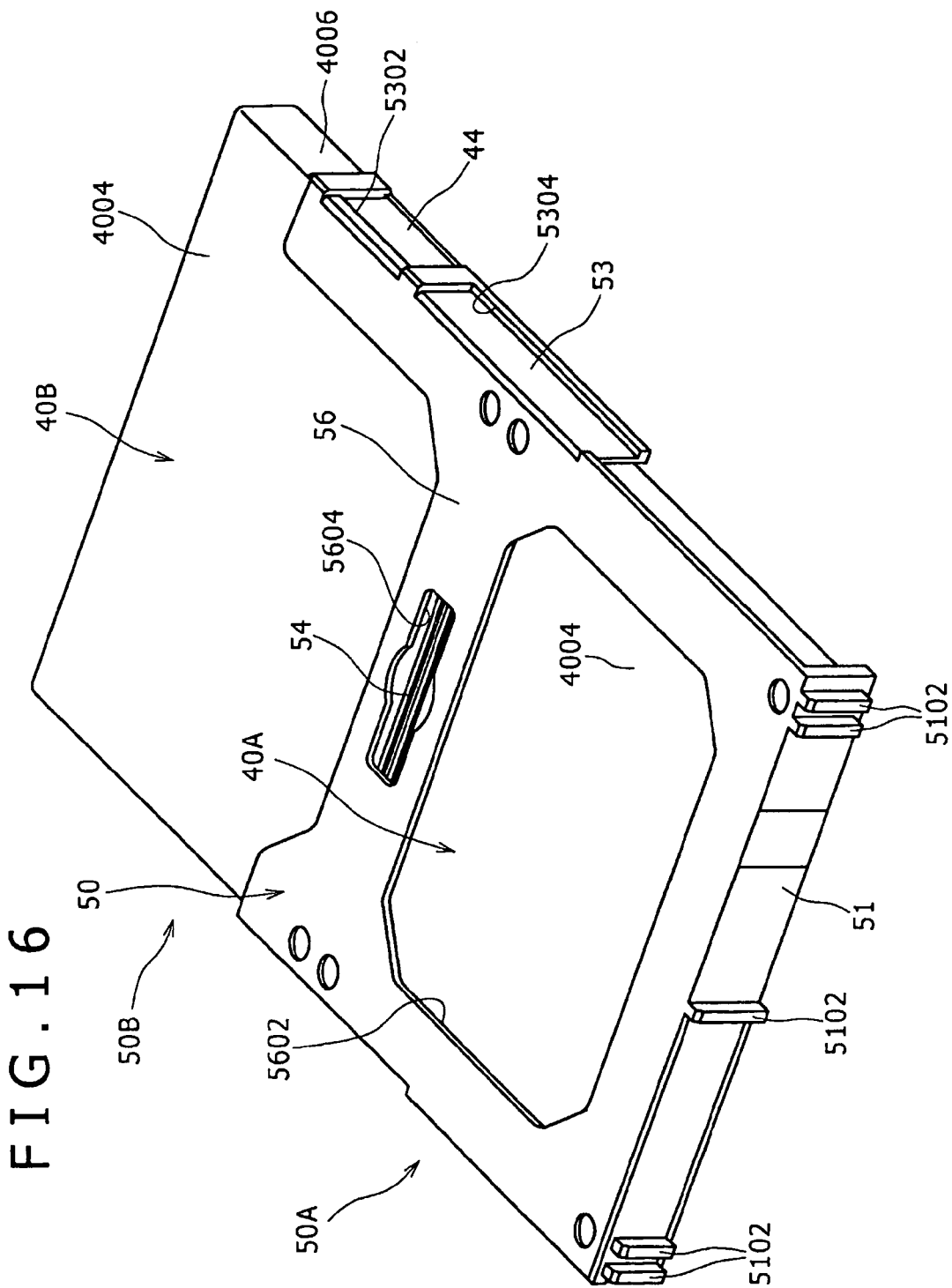

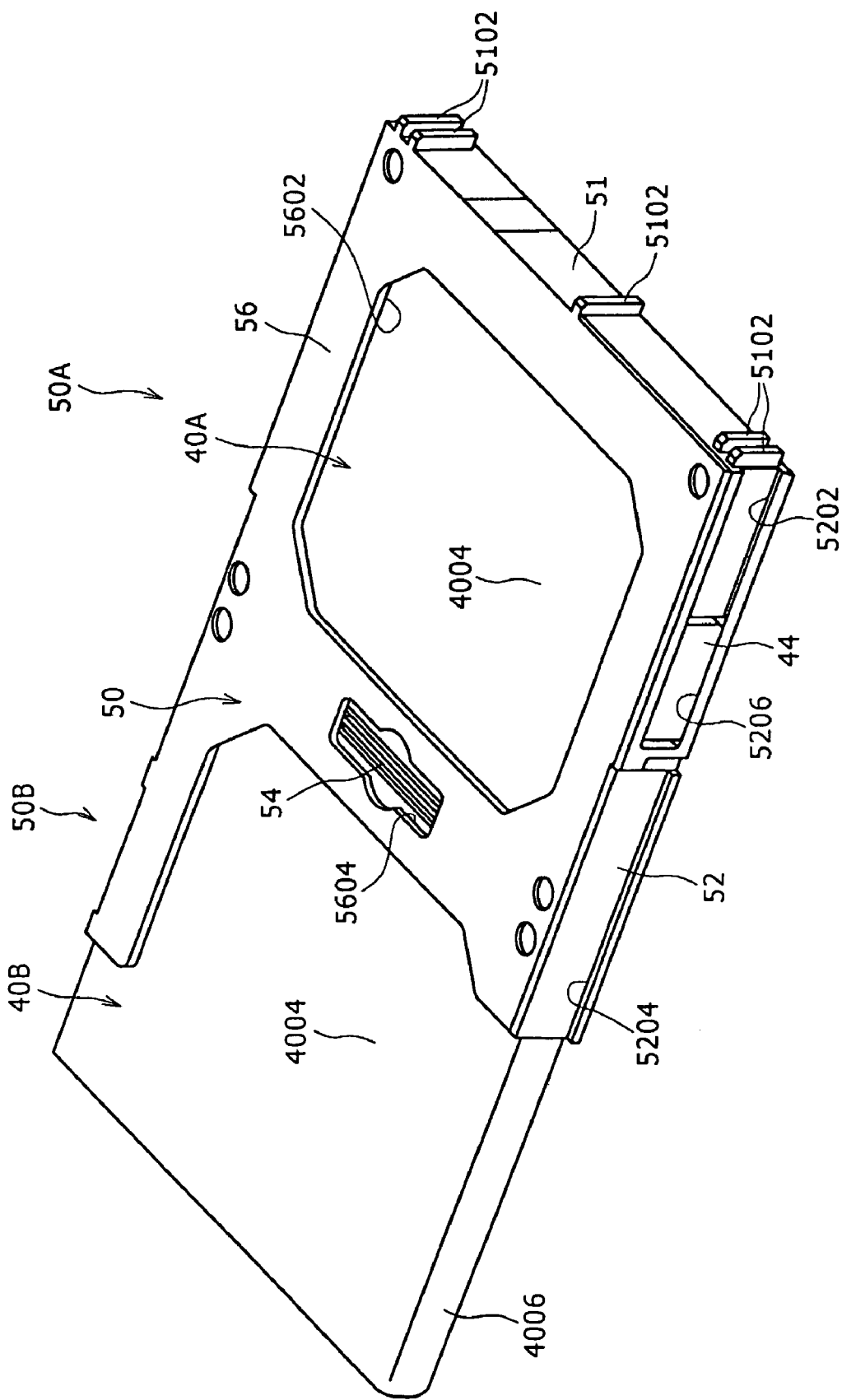

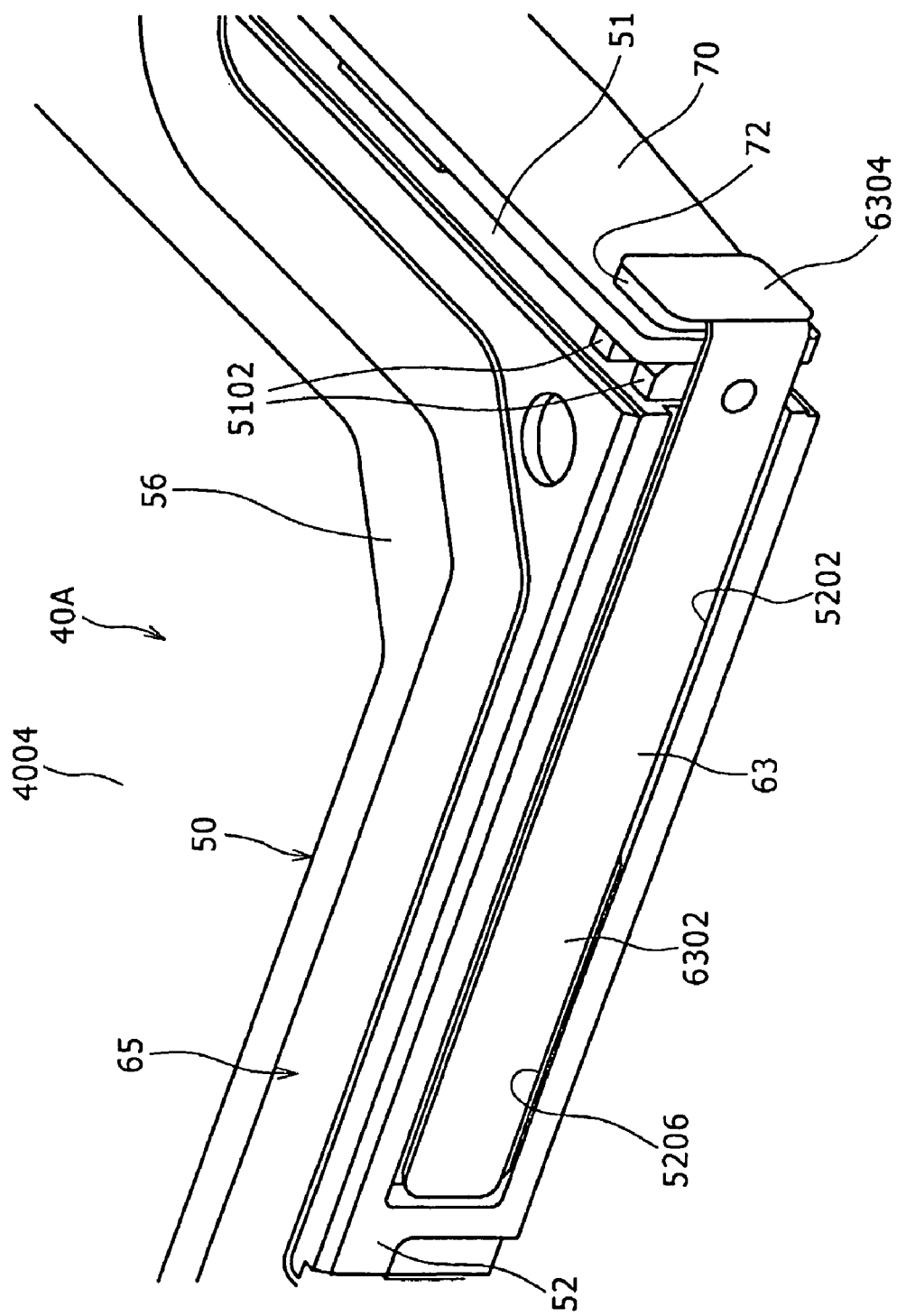

BATTERY CASE

TECHNICAL FIELD

The present invention contains subject matter related to Japanese Patent Application JP 2004-367325 filed in the Japanese Patent Office on Dec. 20, 2004, the entire contents of which being incorporated herein by reference.

This invention relates to a battery adapted to be removably loaded in an electronic apparatus.

BACKGROUND ART

A battery including a case in which a battery cell or cells are accommodated is known and disclosed in Japanese Patent Laid-open No. 2002-245993. In the battery disclosed in the Patent Document, the case is divided into two first and second cases individually having joint portions at which they are joined together. A joining thin wall is provided at the joint portion of one of the cases such that it projects in the thicknesswise direction of the case. Meanwhile, a joining recess is provided at the joint portion of the other of the cases such that the joining thin wall is inserted in the joining recess when the joint portions of the two cases are jointed with each other. In the state that the joining portions joint with each other, the joining thin wall and the joining recess are joined together by ultrasonic welding.

DISCLOSURE OF INVENTION

In a battery that two cases are joined together by ultrasonic welding in this manner, if they are welded while the joint portions of them are deformed by partial deflection or the like, then the welding is not performed with certainty. Therefore, it is important how to prevent possible deformation of the joint portions of the two cases.

It is desirable to provide a battery that two divisional cases can be welded to each other with certainty.

According to an embodiment of the present invention, a battery is configured such that a joining thin wall and a joining recess are provided and a projecting wall is provided at a location of an outer face positioned on the outer side of the joining recess provided on one of first and second cases such that it extends along the joining recess.

More particularly, according to an embodiment of the present invention, a battery includes a case, and a battery cell accommodated in the case. The case is divided in a thicknesswise direction of the battery cell into a first case and a second case. The first and second cases have joint portions formed along peripheries thereof for jointing with each other. The joint portion of one of the first and second cases has a joining thin wall formed to extend along a periphery thereof and project in the thicknesswise direction. The joint portion of the other of the first and second cases has a joining recess formed to extend along a periphery thereof for receiving the joining thin wall inserted therein in a state that the joint portions of the first and second cases joint with each other. The joining thin wall and the joining recess in which the joining thin wall is inserted while the joint portions of the first and second cases joint with each other are joined together by welding. The other case has a projecting wall formed at a location of an outer face thereof positioned on the outer side of the joining recess in such a manner as to extend along the joining recess.

In the battery, the joining thin wall and the joining recess are provided and besides the projecting wall is provided which is formed at a location of an outer face of one of the first and second cases which is positioned on the outer side of the joining recess provided on the one of the first and second cases in such a manner as to extend along the joining recess. Therefore, when the joint portions of the first and second cases are joined together by ultrasonic welding in a state that a welding jig is contacted with the end of the projecting wall, since contacting faces of clamps contact with the end face of the projecting wall which has high rigidity, the contact of the contacting faces of the clamps and the end face of the projecting wall can be kept with certainty and deformation of the joint portions of the first and second cases can be prevented. Consequently, the two divisional cases can be welded with certainty.

BRIEF DESCRIPTION OF DRAWINGS

FIG. 2A is a plan view of the battery;

FIG. 2B is a view as viewed in the direction indicated by an arrow mark B of FIG. 2A;

FIG. 2C is a view as viewed in the direction indicated by an arrow mark C of FIG. 2A;

FIG. 2D is a view as viewed in the direction indicated by an arrow mark D of FIG. 2A;

FIG. 2E is a view as viewed in the direction indicated by an arrow mark E of FIG. 2D;

FIG. 2F is a view as viewed in the direction indicated by an arrow mark F of FIG. 2E;

FIG. 4 is a perspective view of the battery as viewed from an obliquely forwardly upward direction;

FIG. 14A is a view as viewed in the direction indicated by an arrow mark A in FIG. 12;

FIG. 14B is a view as viewed in the direction indicated by an arrow mark B in FIG. 12;

FIGS. 16 to 18 are perspective views as viewed in different directions showing a battery cell held by a holding member of the battery;

FIG. 24 is a perspective view of welded portions of one of the conductive plates of the battery cell;

BEST MODE FOR CARRYING OUT THE INVENTION

Figure 1:
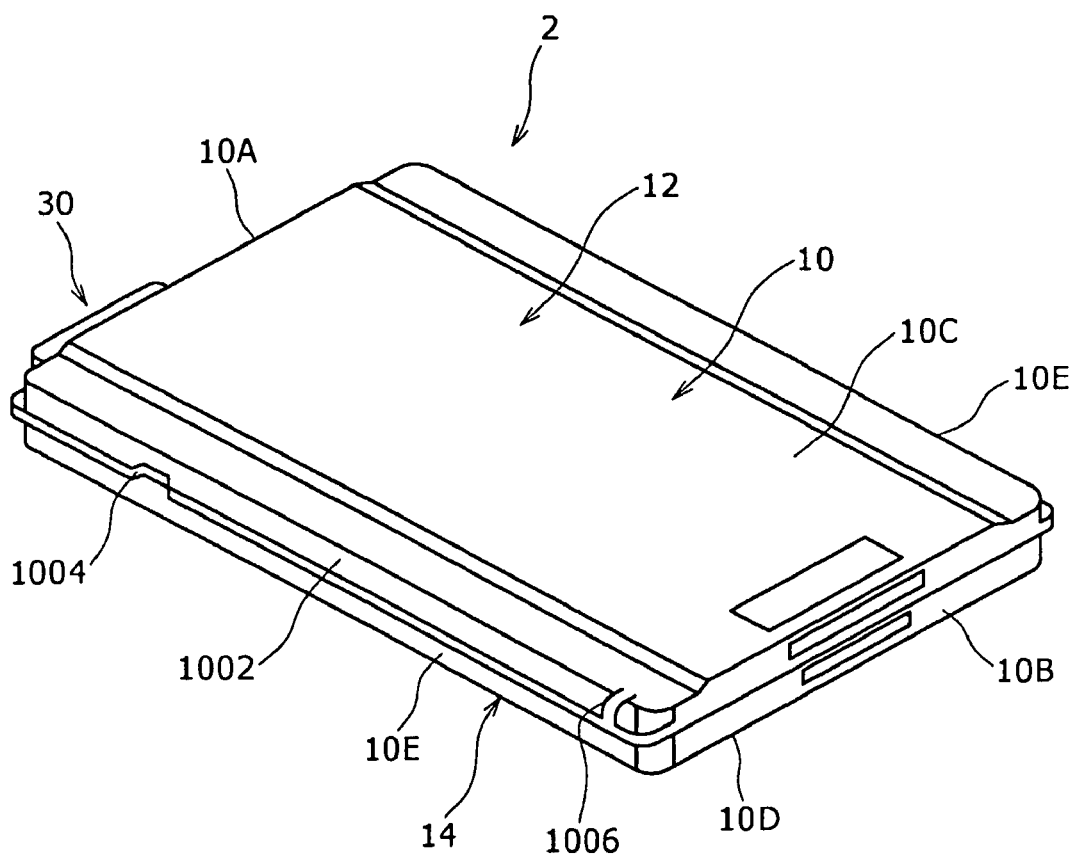
FIG. 1 is a perspective view of a battery according to a first embodiment of the present invention.

An embodiment of the present invention is described below with reference to the drawings.

Referring first to FIGS. 1 to 5, there is shown a battery to which the present invention is applied. The battery 2 shown is removably loaded into a battery accommodating chamber, for example, of an electronic apparatus. The battery 2 includes a case 10 for accommodating two battery cells 40, a connector 30 exposed from the case 10, a holding member 50 for holding the battery cells 40 in the case 10, a conductive plate 60, and a printed circuit board 70.

The case 10 has a form of a flattened rectangular plate and, in the present embodiment, is flattened and has a rectangular shape as viewed in plan.

The case 10 is divided in a thicknesswise direction of the battery cells 40 into an upper case 12 serving as a second case and a lower case 14 serving as a first case. The upper and lower cases 12 and 14 are joined together through a joining thin wall 1420 and a joining recess 1220.

The upper case 12 and the lower case 14 have joint portions 1201 and 1401 provided on peripheries thereof for jointing with each other.

The case 10 is formed in the form of a flattened rectangular plate having an upper wall 10C and a lower wall 10D positioned at the opposite ends in the direction a thickness, a pair of left and right side walls 10E positioned at the opposite ends in the direction of a width having a dimension greater than the thickness, and a front side wall 10A and a rear side wall 10B positioned at the opposite ends of a length in a forward and backward direction having a dimension greater than the width. It is to be noted that the leftward and rightward direction of the case 10 is represented as that as viewed from forwardly of the case 10.

The lower case 14 has a lower wall 10D of a rectangular shape as viewed in plan which faces one of the opposite faces of the battery cells 40 in the thicknesswise direction, a front side wall 10A and a rear side wall 10B extending perpendicularly from the minor sides of the lower wall 10D, and a pair of left and right side walls 10E extending perpendicularly from the major sides of the lower wall 10D.

The upper case 12 has an upper wall 10C of a rectangular shape as viewed in plan which faces the other one of the opposite faces of the battery cell 40 in the thicknesswise direction, a front side wall 10A and a rear side wall 10B extending perpendicularly from the minor sides of the upper wall 10C, and a pair of left and right side walls 10E extending perpendicularly from the major sides of the upper wall 10C.

The front side wall 10A of the upper case 12 and the lower case 14 has an opening 3206 formed therein for exposing the connector 30 therethrough. A connector wall portion 32 for reinforcing the connector 30 is formed around the opening 3206.

The joint portions 1201 and 1401 of the upper case 12 and the lower case 14 are formed from extremities of the side walls 10A, 10B, and 10E.

Figure 33:
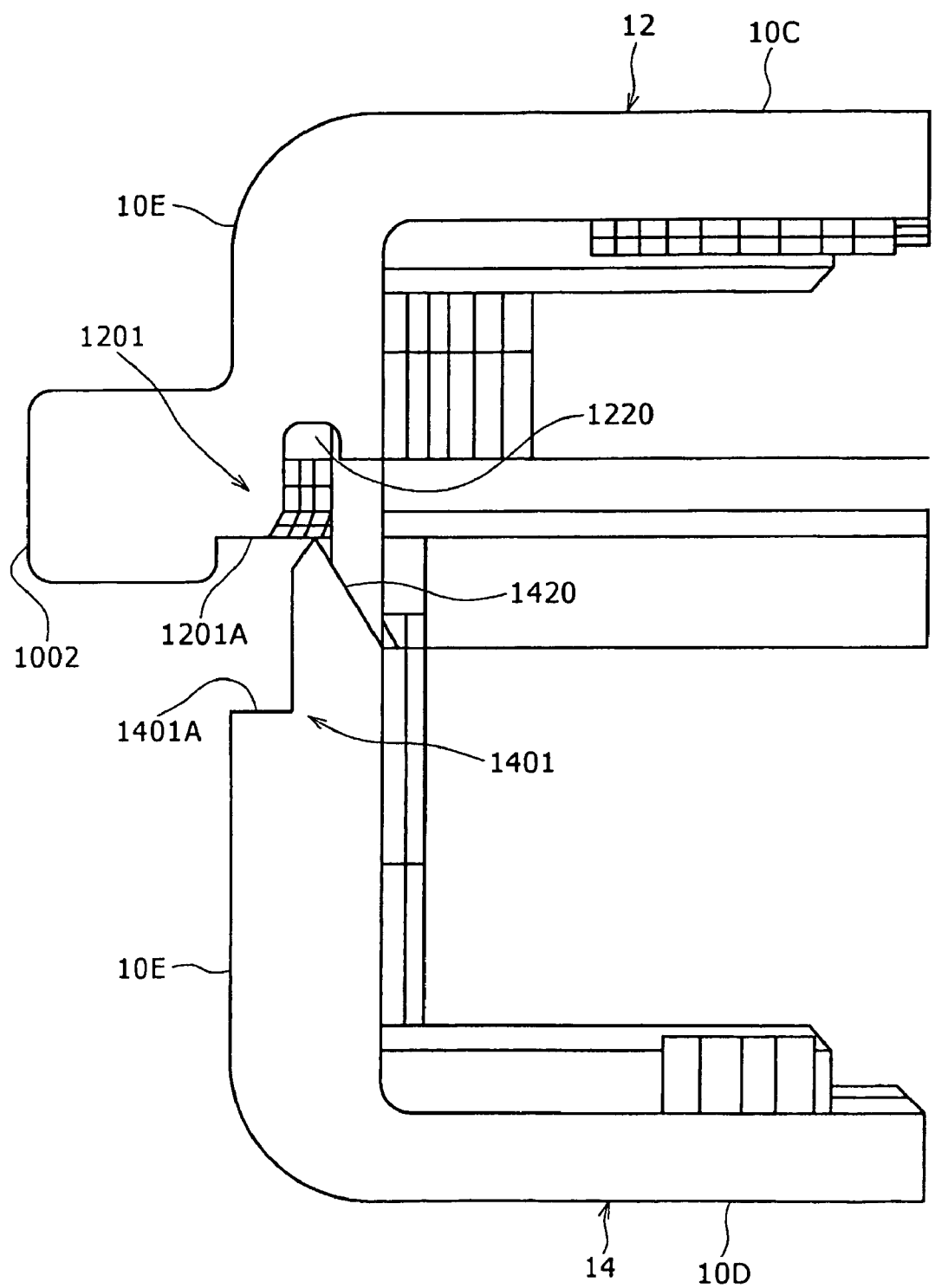
FIG. 33 is a schematic view showing joint portions of the upper case and the lower case before welded.

Referring to FIG. 33, the joining thin wall 1420 is formed on the joint portion 1401 of the lower case 14. More particularly, the joining thin wall 1420 is formed on an inner side portion of the lower case 14 leaving an end face 1401A at an extremity of each side wall 10E at a location of the joint portion 1401 of the lower case 14. In the present embodiment, the end face 1401A is formed from a flat face.

The joining recess 1220 is formed on an inner side portion of the upper case 12 leaving an end face 1201A of the side wall 10E at an outer side portion of the upper case 12 at a location of the joint portion 1201 of the upper case 12. In the present embodiment, the end face 1201A is formed from a flat face.

Figure 31:
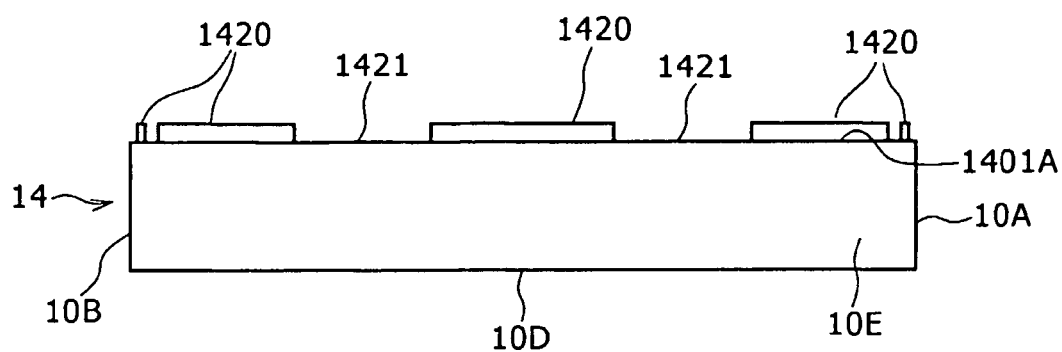
FIG. 31 is a view as viewed in the direction indicated by an arrow mark A of FIG. 8.
Figure 32:
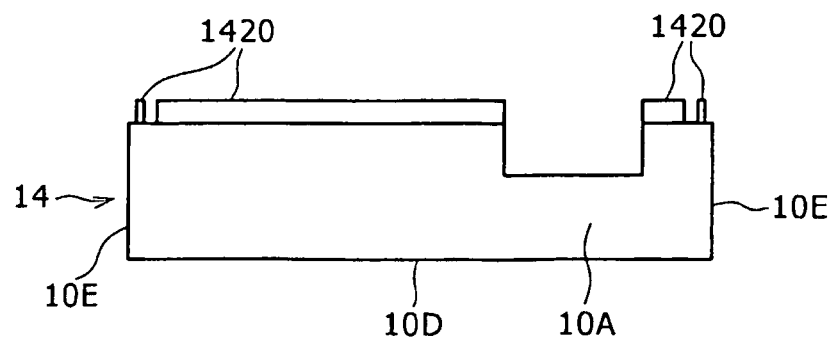
FIG. 32 is a view as viewed in the direction indicated by an arrow mark B of FIG. 8.

Referring to FIG. 31, the joining thin wall 1420 positioned on the two major sides of the rectangular shape has cutaway portions 1421 formed by cutting away the joining thin wall 1420 at locations of the rectangular shape rather near to the minor sides (rather near to the side walls 10E), that is, at locations of the rectangular shape rather near to the front side wall 10A and the rear side wall 10B.

The upper case 12 and the lower case 14 are joined together such that the joint portions 1201 and 1401 thereof joint with each other and the joining thin wall 1420 and the joining recess 1220 in which the joining thin wall 1420 is fitted are welded by ultrasonic welding.

Figure 7:
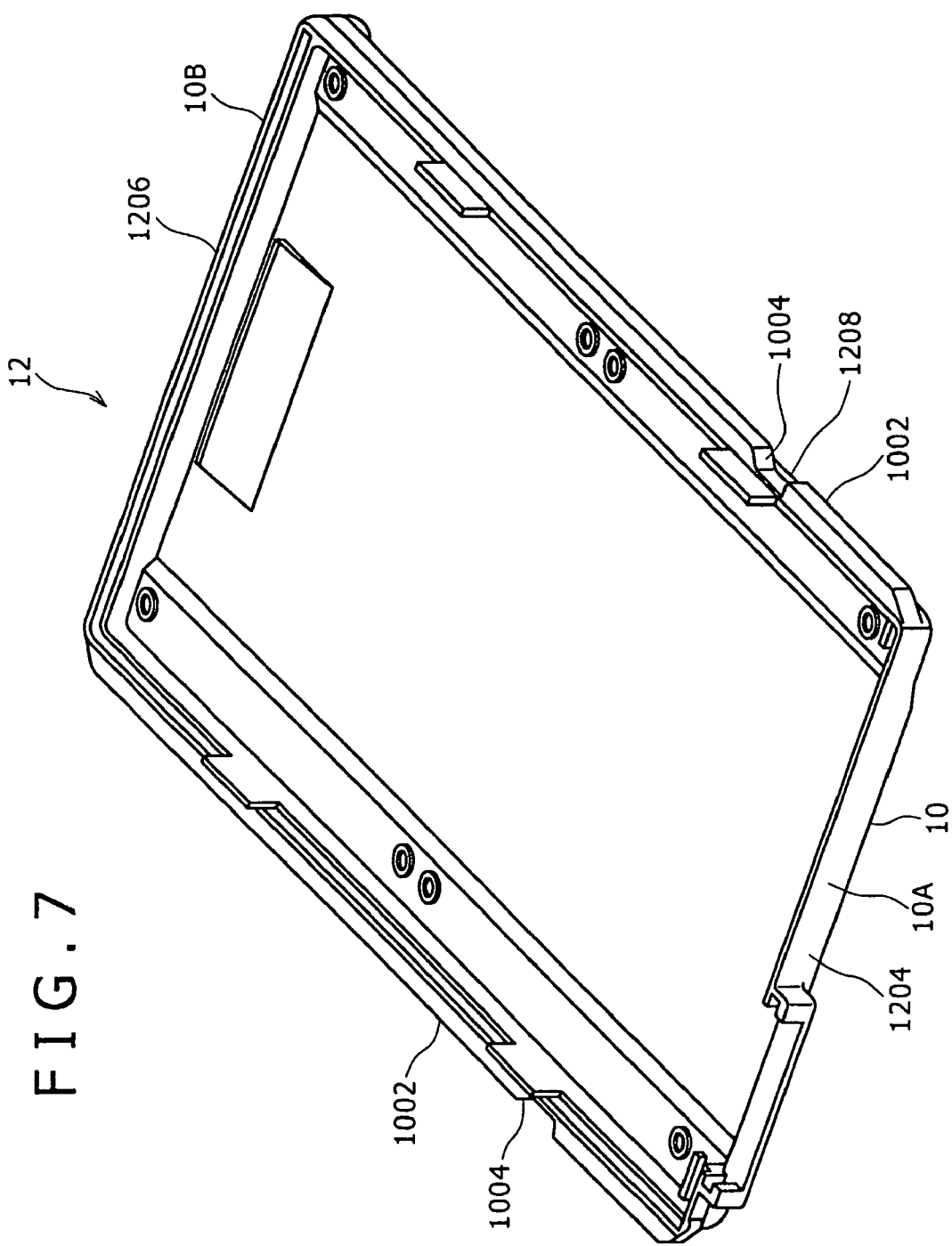
FIG. 7 is a perspective view of an upper case of the battery.
Figure 8:
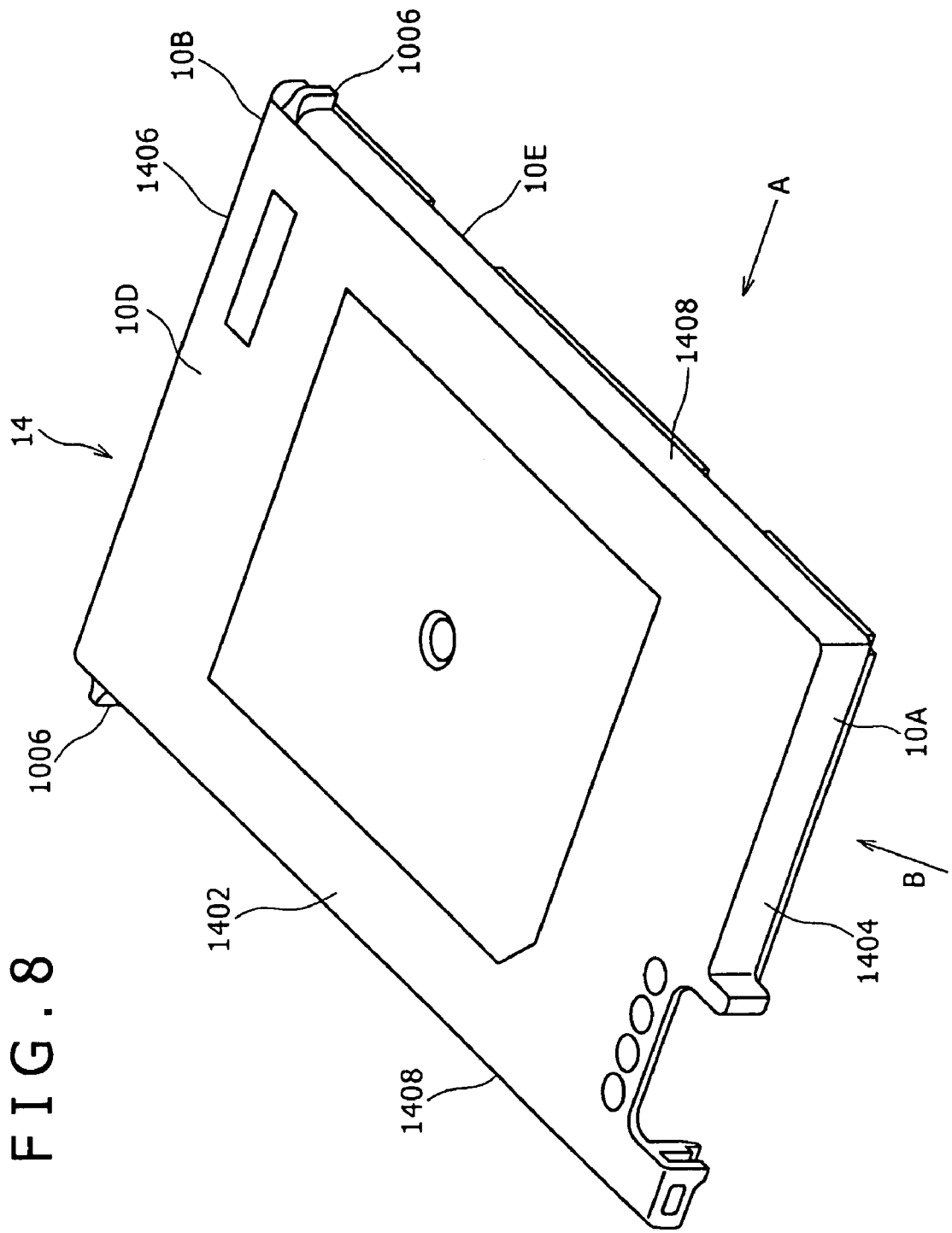
FIG. 8 is a perspective view of a lower case of the battery.

Referring to FIGS. 7 and 33, the projecting wall 1002 is provided at a location of an outer face of the upper case 12 positioned on the outer side of the joining recess 1220 such that it projects outwardly in a widthwise direction and extends along the joining recess 1220. In the present embodiment, a pair of projecting walls 1002 are formed at locations of the side walls 10E of the upper case 12 corresponding to the two major sides of the rectangular shape, that is, at locations of the left and right side walls 10E, such that they extend with an equal height along the direction in which the left and right side walls 10E extend.

Further, in the present embodiment, in the state that the joining thin wall 1420 is inserted in the joining recess 1220 and the joint portions 1201 and 1401 of the upper case 12 and the lower case 14 are jointed with and welded to each other, the end face 1401A remaining at the extremity of the side walls 10E of the upper case 12 and the end face 1201A remaining at the extremity of the side walls 10E of the upper case 12 are spaced away from each other in the thicknesswise direction of the battery cells 40, and the location of the projecting walls 1002 which are positioned on the lower wall 10D side is positioned nearer to the lower wall 10D than to the end face 1401A at the extremity of the side walls 10E remaining on the upper case 12.

A cutaway portion 1004 for preventing letting off is formed at an intermediate portion of each of the projecting walls 1002 in the extension direction. In the present embodiment, the cutaway portion 1004 is formed at a location of each projecting wall 1002 rather near to the front side wall 10A.

The projecting wall 1002 is engaged, when the battery 2 is inserted into the battery accommodating chamber, with an engaging groove (not shown) provided in the battery accommodating chamber to position the battery 2 in the thicknesswise direction in the battery accommodating chamber.

Further, in a state that the battery 2 is inserted in the battery accommodating chamber and the connector 30 and an electronic apparatus side connector section are coupled to each other, a letting off preventing projection (not shown) provided in the battery accommodating chamber is releasably engaged with the cutaway portion 1004 thereby to stabilize the loaded state of the battery 2.

Further, a stopper wall 1006 is formed in a swollen state at a location of each of the two side walls 10E rather near to the rear side wall 10B. The stopper walls 1006 are connected to the projecting walls 1002 so that the rear side wall 10B of the battery may not be inserted into the battery accommodating chamber of the electronic apparatus and serve as reverse insertion preventing walls.

Further, in the present embodiment, a plurality of projections 15 is formed at different locations on an inner face of the upper wall 10C of the upper case 12 and on an inner face of the lower wall 10D of the lower case 14. The battery cells 40 are held in the case 10 by the projections 15.

Further, in the present embodiment, a displaced portion 1210 is formed on the upper wall 10C of the upper case 12 such that it is displaced upwardly at a central portion of the upper wall 10C in the widthwise direction over the overall length in the lengthwise direction with respect to the remaining portions of the upper wall 10C near to the opposite sides in the widthwise direction. Meanwhile, another displaced portion 1211 is formed on the lower wall 10D of the lower case 14 such that it is displaced at a central portion of the lower wall 10D in the widthwise direction over the overall length in the lengthwise direction with respect to the remaining portions of the lower wall 10D near to the opposite sides in the widthwise direction. Gaps 1212 and 1213 are formed between the inner faces of the displaced portions 1210 and 1211 and an upper face 4002 and a lower face 4004 of the battery cells 40 accommodated in the case 10 such that they absorb, when the battery cells 40 are expanded upon charging, the expansion.

Referring to FIGS. 1 to 6, the connector 30 is provided on the front side wall 10A of the case 10 such that it projects forwardly. In the present embodiment, the connector 30 is provided at a location of the front side wall 10A rather near to a right end in the widthwise direction and extends in the widthwise direction.

The position of the connector 30 in the thicknesswise direction on the front side wall 10A is determined with reference to faces of the projecting walls 1002 of the left and right side walls 10E which oppose to the upper wall 10C or the lower wall 10D. In the present embodiment, the walls 1002A of the projecting walls 1002 which oppose to the lower wall 10D make a reference to the position of the connector 30 in the thicknesswise direction.

Referring to FIGS. 3A to 3C and 9, the connector 30 has a channel-shaped connector wall section 32 swollen in the lengthwise direction from the front side wall 10A. The connector 30 has a terminal forming member 36 disposed on the inner side of the connector wall portion 32, and a contact section 33 (FIG. 27) connected to the battery cells 40.

The connector wall section 32 is provided to reinforce the connector 30 and has a pair of vertical walls 3202 spaced from each other in the widthwise direction and extending in the thicknesswise direction, and a transverse wall 3204 extending in the widthwise direction at a location rather near to the upper wall 10C and interconnecting end portions of the vertical walls 3202 in the thicknesswise direction.

The vertical walls 3202 and the transverse wall 3204 cooperatively define the space 3206 which is open in the lengthwise direction (forwardly) and is open to the other face (downwardly) from between the faces at the opposite ends in the thicknesswise direction.

Figure 9:
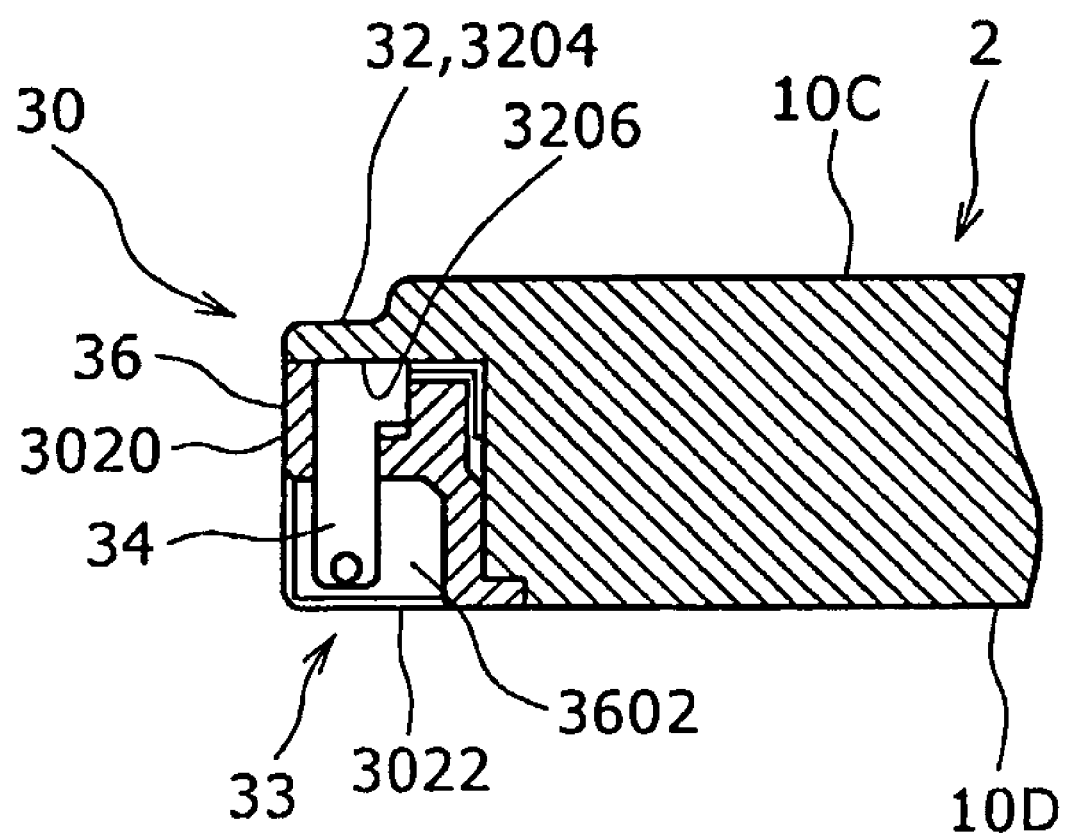
FIG. 9 is a sectional view of a connector section of the battery.
Figure 10:
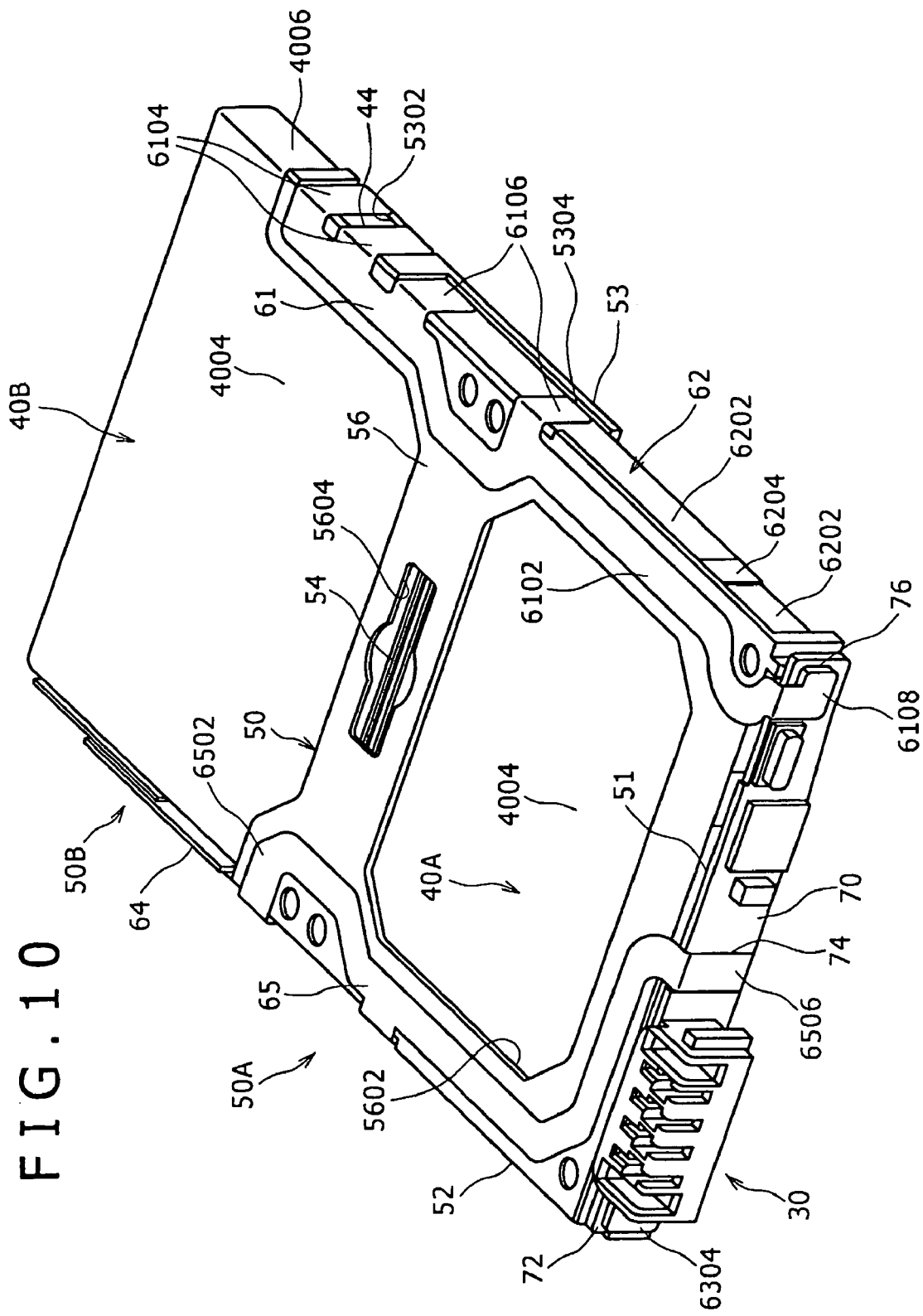
FIG. 10 is a perspective view of a battery cell section of the battery with a case removed.

Referring to FIGS. 4 and 9, the terminal forming member 36 is made of an insulating material such as a synthetic resin material and disposed in the open space 3206.

The terminal forming member 36 has a plurality of grooves 3602 formed in a spaced relationship from each other in the widthwise direction in such a manner as to be open in the lengthwise direction (forwardly) and extend in the thicknesswise direction. The grooves 3602 are formed such that they are open to the lower wall 10D.

Now, an internal structure of the battery 2 is described.

Figure 25A:
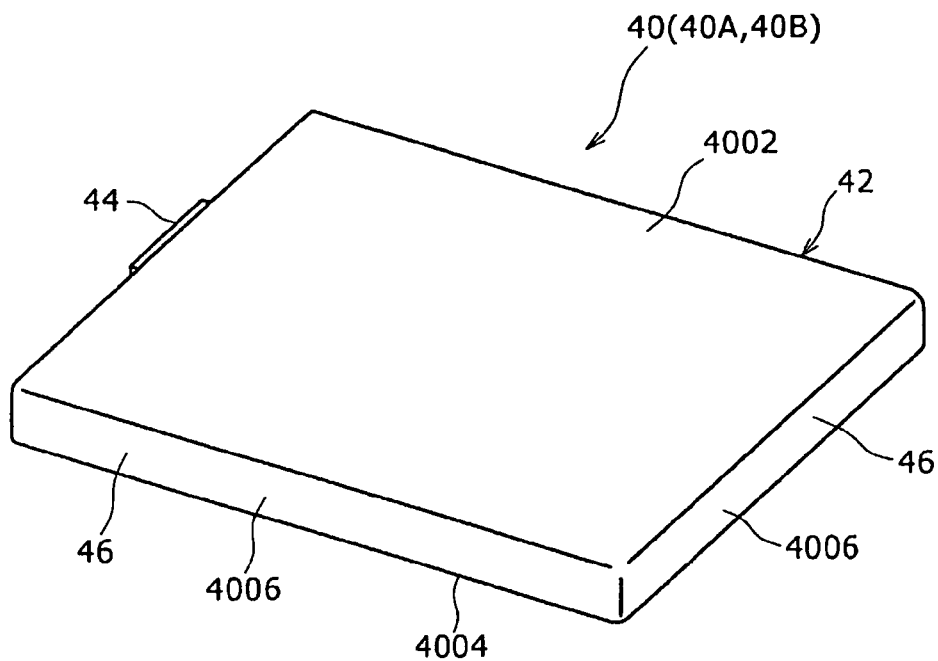
FIGS. 25A and 25B are perspective views of the battery cell.
Figure 25B:
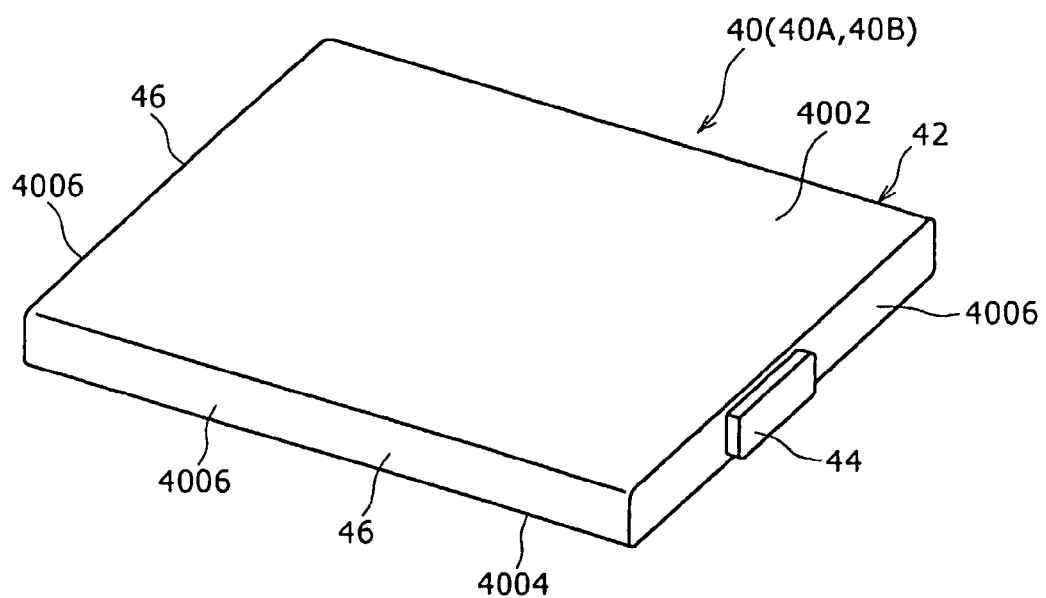

First, the battery cells 40 are described with reference to FIGS. 25A and 25B. Each of the battery cells 40 in the present embodiment is formed as a rechargeable battery cell such as lithium ion cell or a nickel hydrogen cell.

The battery cell 40 has a sheath can 42 in the form of a flattened rectangular plate which in turn has an upper face 4002 and a lower face 4004 of a rectangular, shape made of a conductive metal material and positioned at the opposite ends in the thicknesswise direction and four side faces 4006 interconnecting the upper face 4002 and the lower face 4004. In the present embodiment, the sheath can 42 is formed from a steel material on which nickel is plated.

A positive terminal 44 of the battery cell 40 is formed in a projecting manner on one of the four side faces 4006 such that it is isolated from the sheath can 42. More particularly, a swollen portion made of a nonconductive material and having a rectangular cross section is formed in a projecting manner on the side face 4006, and an end face of the swollen portion serves as the positive terminal 44. Further, a remaining location of the sheath can 42 other than the location at which the positive terminal 44 is provided is formed as a negative terminal 46 of the battery cell 40.

Referring to FIGS. 16 to 18 and 21, the holding member 50 includes a first battery accommodating section 50A and a second battery accommodating section 50B for accommodating the two battery cells 40 in a state that the battery cells 40 are juxtaposed in a rectangular shape in plan.

The holding member 50 is made of a nonconductive resilient material and has a first side piece 51, a second side piece 52, a third side piece 53, a fourth side piece 54, and edge pieces 56. The first side piece 51 is applied to the side faces 4006 of the sheath can 42 of the battery cell 40 accommodated in the first battery accommodating section 50A which corresponds to a minor side of the rectangular shape as viewed in plan. The second side piece 52 is applied to the side faces 4006 of the sheath can 42 of the battery cell 40 which correspond to one of the major sides of the rectangular shape as viewed in plan. The third side piece 53 is applied to the side faces 4006 of the sheath can 42 of the battery cell 40 which corresponds to the other major side of the rectangular shape in plan. The fourth side piece 54 is disposed between the opposing side faces 4006 of the sheath cans 42 of the two battery cells 40. The edge pieces 56 project from the edges of the four side pieces 51, 52, 53, and 54 and applied to locations of one of the upper face 4002 and the lower face 4004 (in the present embodiment, the lower face 4004) of the sheath cans 42 of the battery cells 40 displaced to the edges.

Referring to FIGS. 16 and 17, in the present embodiment, the two battery cells 40 are accommodated in the first and second battery accommodating chambers 50A and 50B such that the positive terminal 44 of the battery cell 40 accommodated in the first battery accommodating section 50A faces the second side piece 52 while the positive terminal 44 of the battery cell 40 accommodated in the second battery accommodating section 50B faces the third side piece 53.

It is to be noted that, for the convenience of description, the battery cell 40 accommodated in the first battery accommodating section 50A is hereinafter referred to as first battery cell 40A and the battery cell 40 accommodated in the second battery accommodating section 50B is hereinafter referred to as second battery cell 40B.

Figure 19:
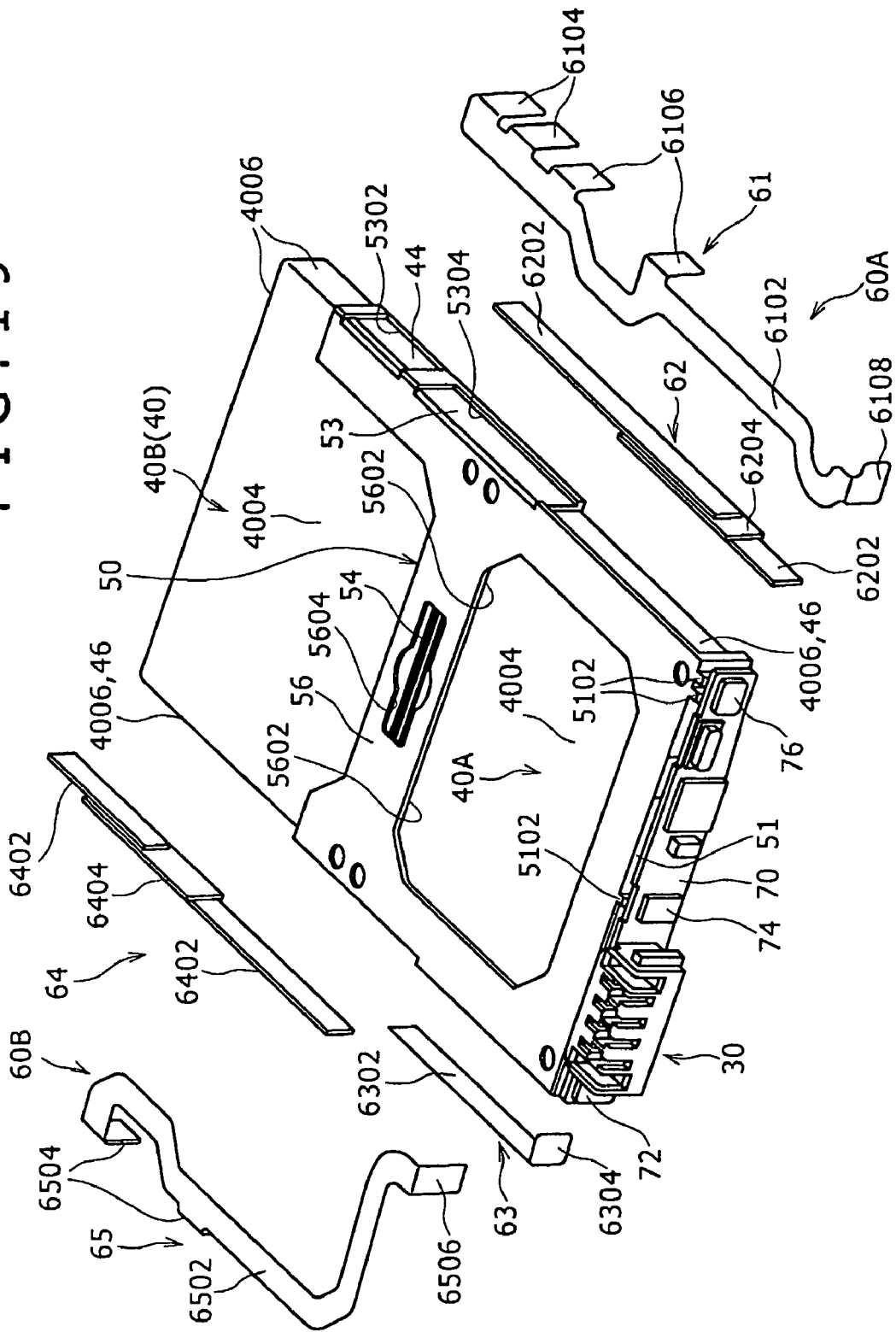
FIG. 19 is an exploded perspective view of the battery cell, the holding member, and conductive plates of the battery.
Figure 21:
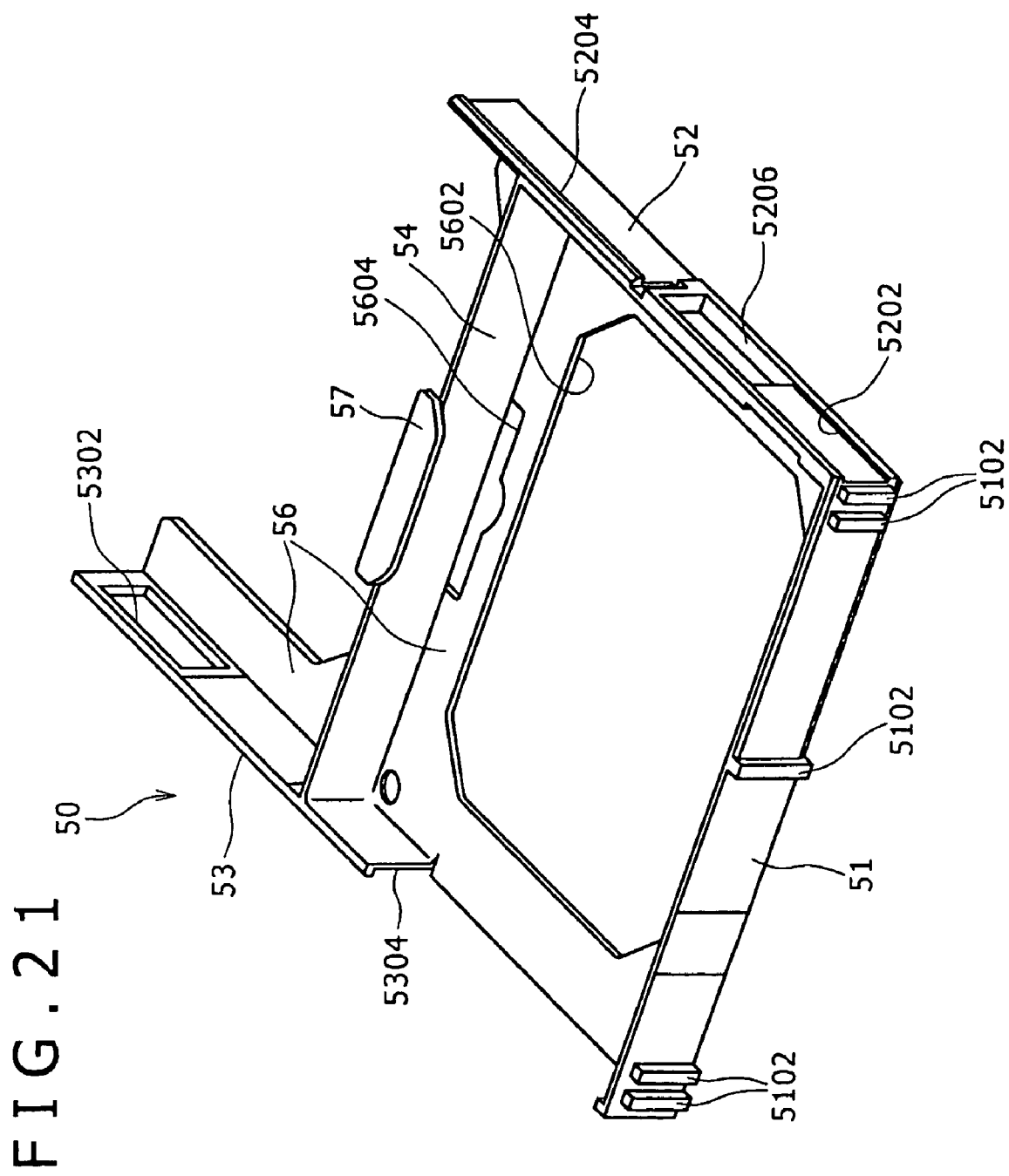
FIG. 21 is a perspective view of the holding member.
Figure 22:
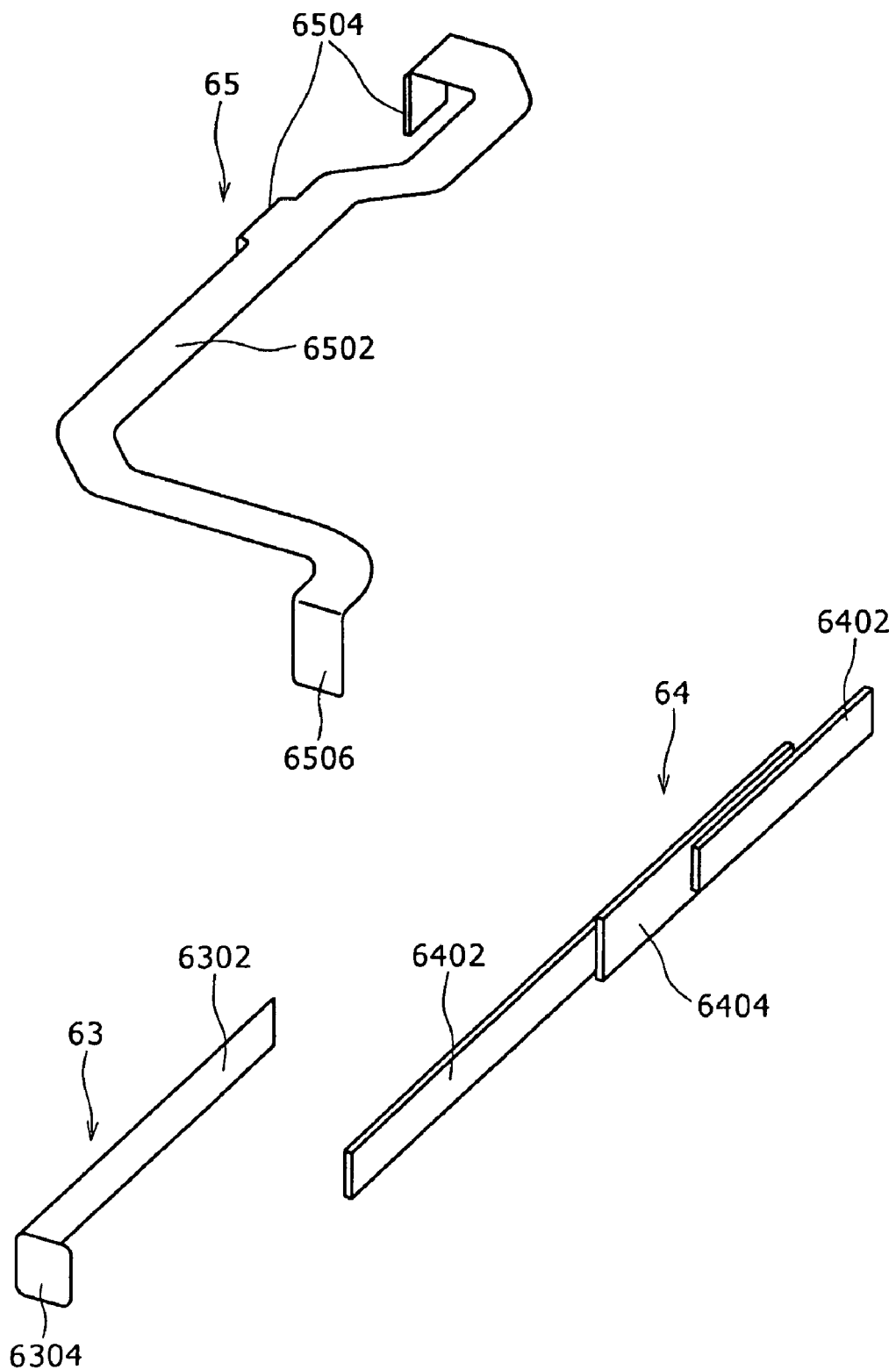
FIGS. 22 and 23 are perspective views of the conductive plates.
Figure 23:
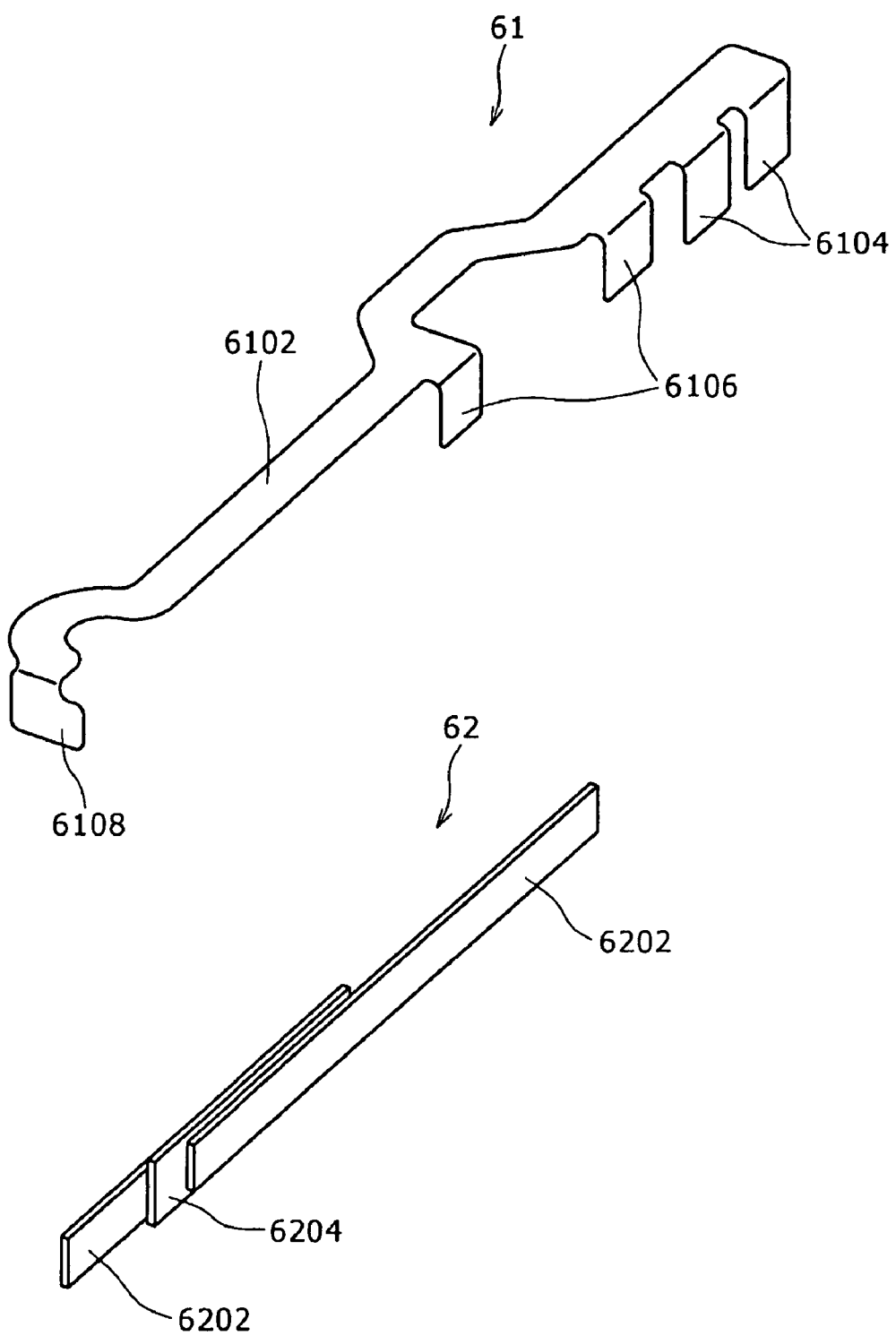

Referring to FIGS. 19 and 21, the first side piece 51 is formed such that it extends over the overall length of one of the side faces 4006 of the sheath can 42 of the first battery cell 40A.

Referring to FIGS. 16 and 19, ribs 5102 for attachment of the printed circuit board 70 are formed in a swollen manner on the surface of the first side piece 51. Thus, the printed circuit board 70 is attached to the first side piece 51 through the ribs 5102 such that it extends along the first side piece 51.

Figure 20A:
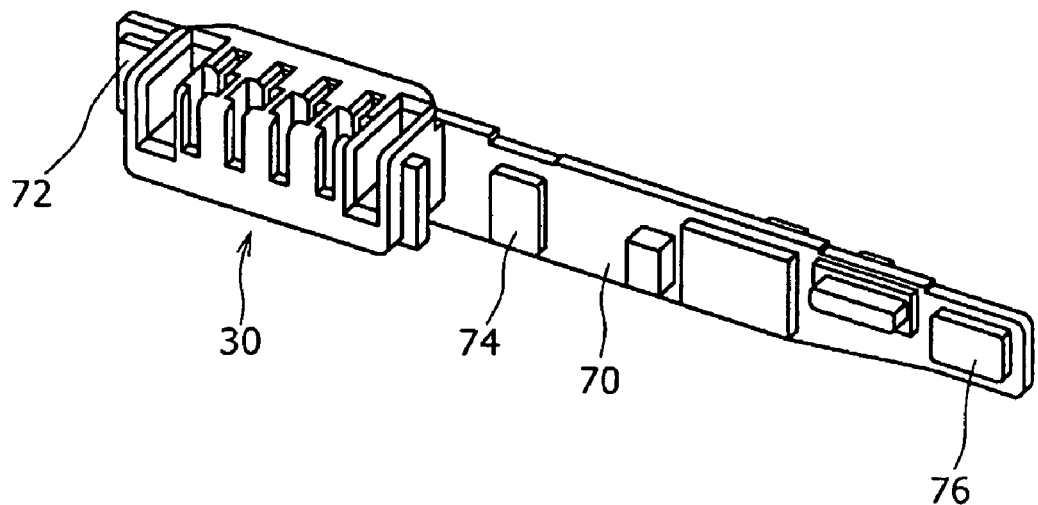
FIGS. 20A and 20B are perspective views of a printed circuit board of the battery as viewed in different directions.
Figure 20B:
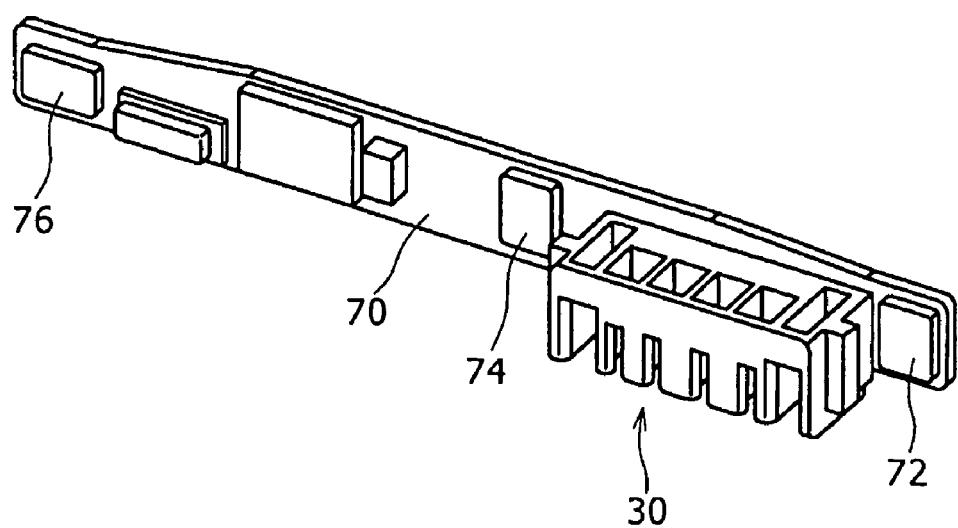

Referring to FIGS. 19, 20A, and 20B, the connector 30 is mounted on the printed circuit board 70. The printed circuit board 70 has a conductive portion 72 for the positive pole, a conductive portion 74 for the negative pole, and a conductive portion 76 for a midpoint formed thereon for connecting to a contact piece 34 for the positive pole, a contact piece 34 for the negative pole, and a contact piece 34 for a midpoint of the connector 30, respectively.

The connector 30 is provided such that it projects forwardly through the opening 3206 from the front side wall 10A of the case 10. In the present embodiment, the connector 30 is provided at a location of the front side wall 10A rather near to a right side end in the widthwise direction such that it extends in the widthwise direction.

The position of the connector 30 in the thicknesswise direction on the front face 10A is determined with reference to faces of the projecting walls 1002 of the left and right side faces 10E which oppose to the upper face 10C or the lower face 10D. In the present embodiment, faces 1002A of the projecting walls 1002 which oppose to the lower face 10D make a reference to the position of the connector 30 in the thicknesswise direction.

Figure 3A:
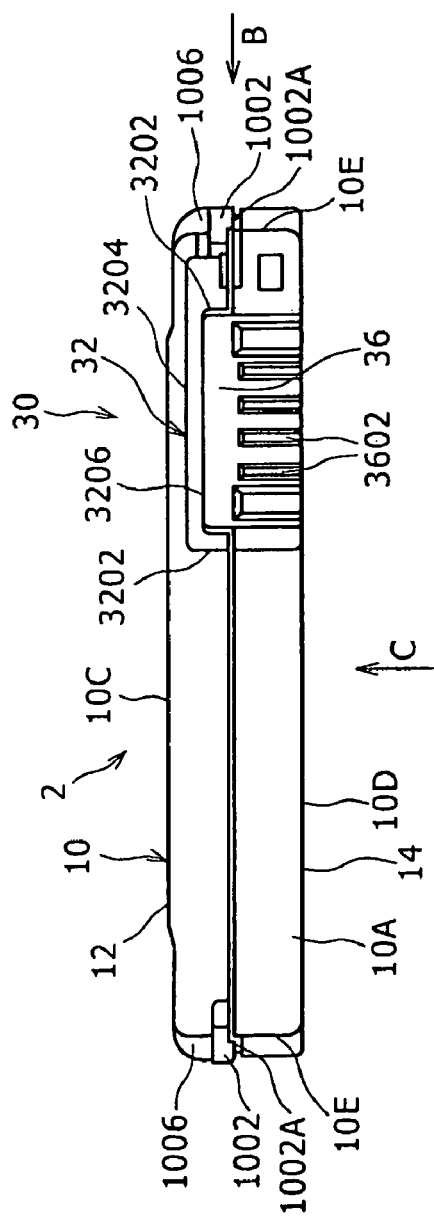
FIG. 3A is a front elevational view of the battery.
Figure 3B:
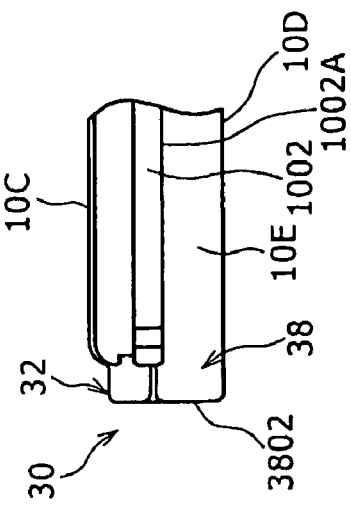
FIG. 3B is a view as viewed in the direction indicated by an arrow mark B of FIG. 3A.
Figure 3C:
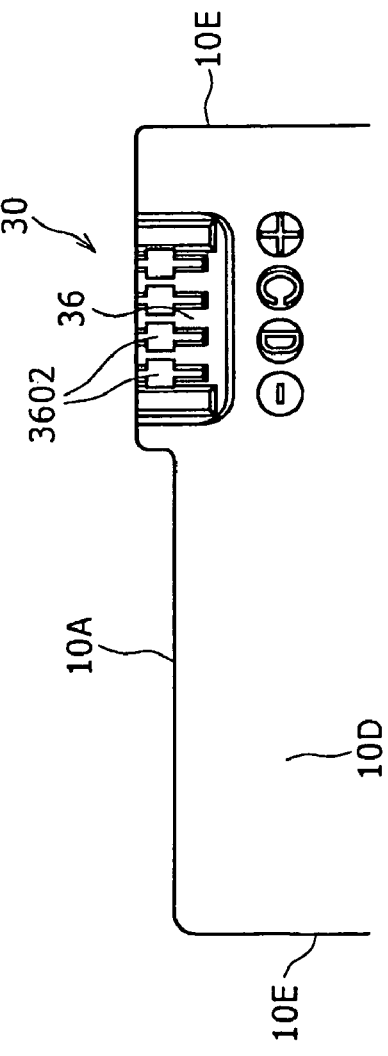
FIG. 3C is a view as viewed in the direction indicated by an arrow mark C of FIG. 3A.
Figure 5:
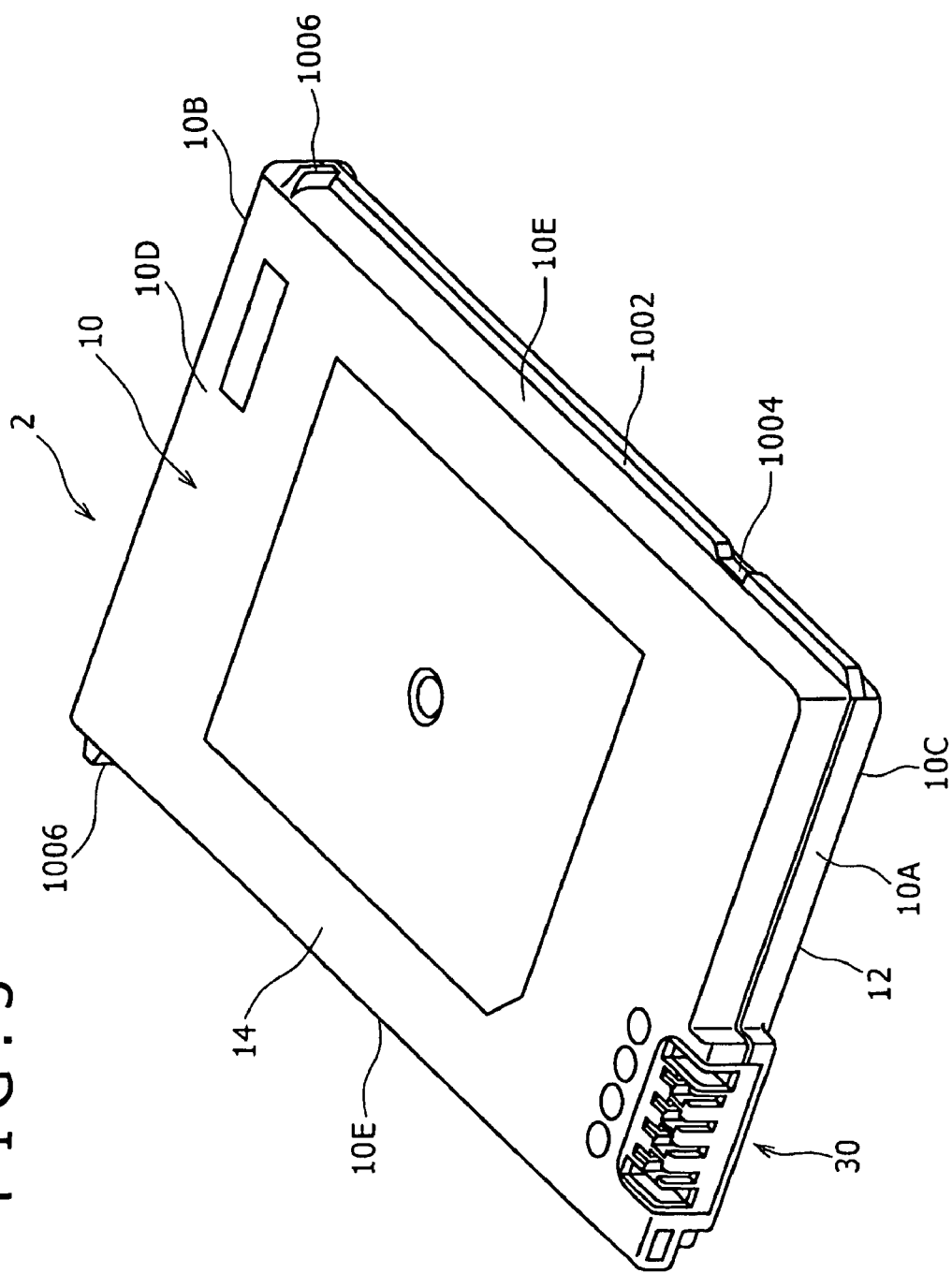
FIG. 5 is a perspective view of the battery in a reversed state as viewed from an oblique upward direction.
Figure 6:
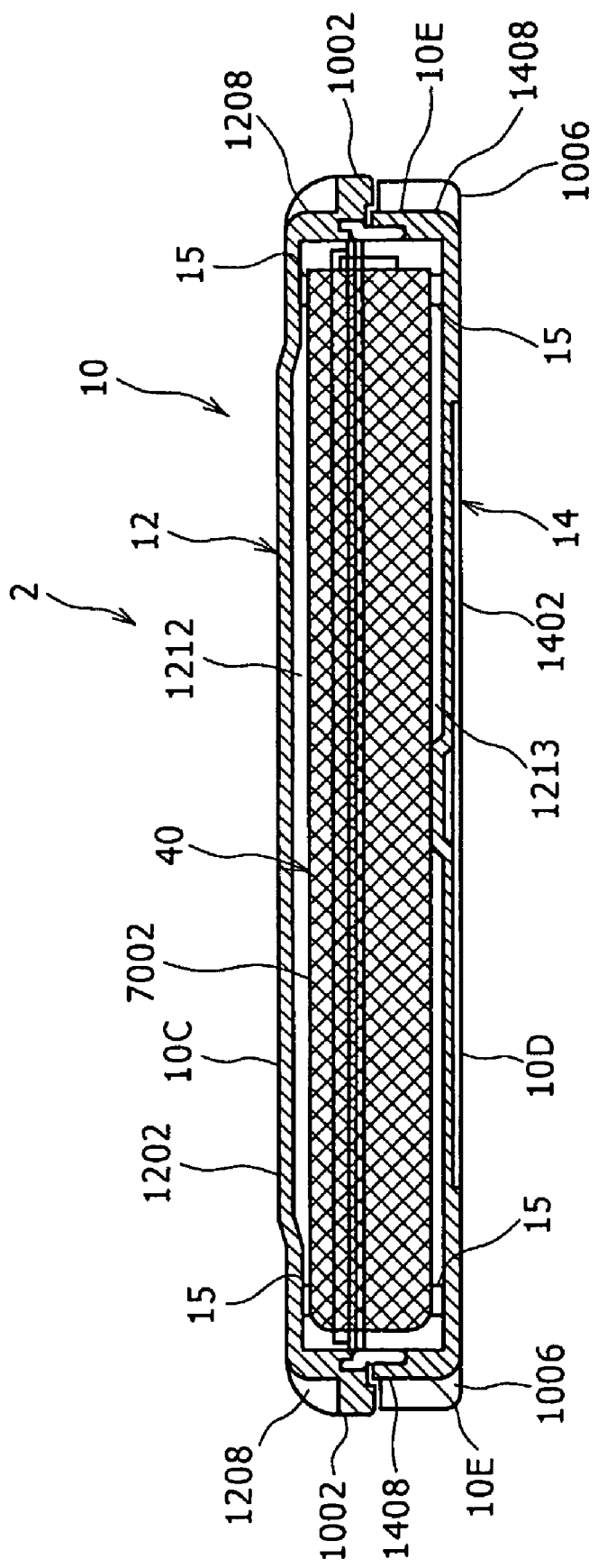
FIG. 6 is a sectional view of the battery.

Referring to FIGS. 3A to 3C, the connector 30 has a terminal forming member 36 made of an insulating material such as a synthetic resin material and contact piece portions 33 (FIG. 27) incorporated in the terminal forming member 36 and connected to the battery cells 40.

Figure 26:
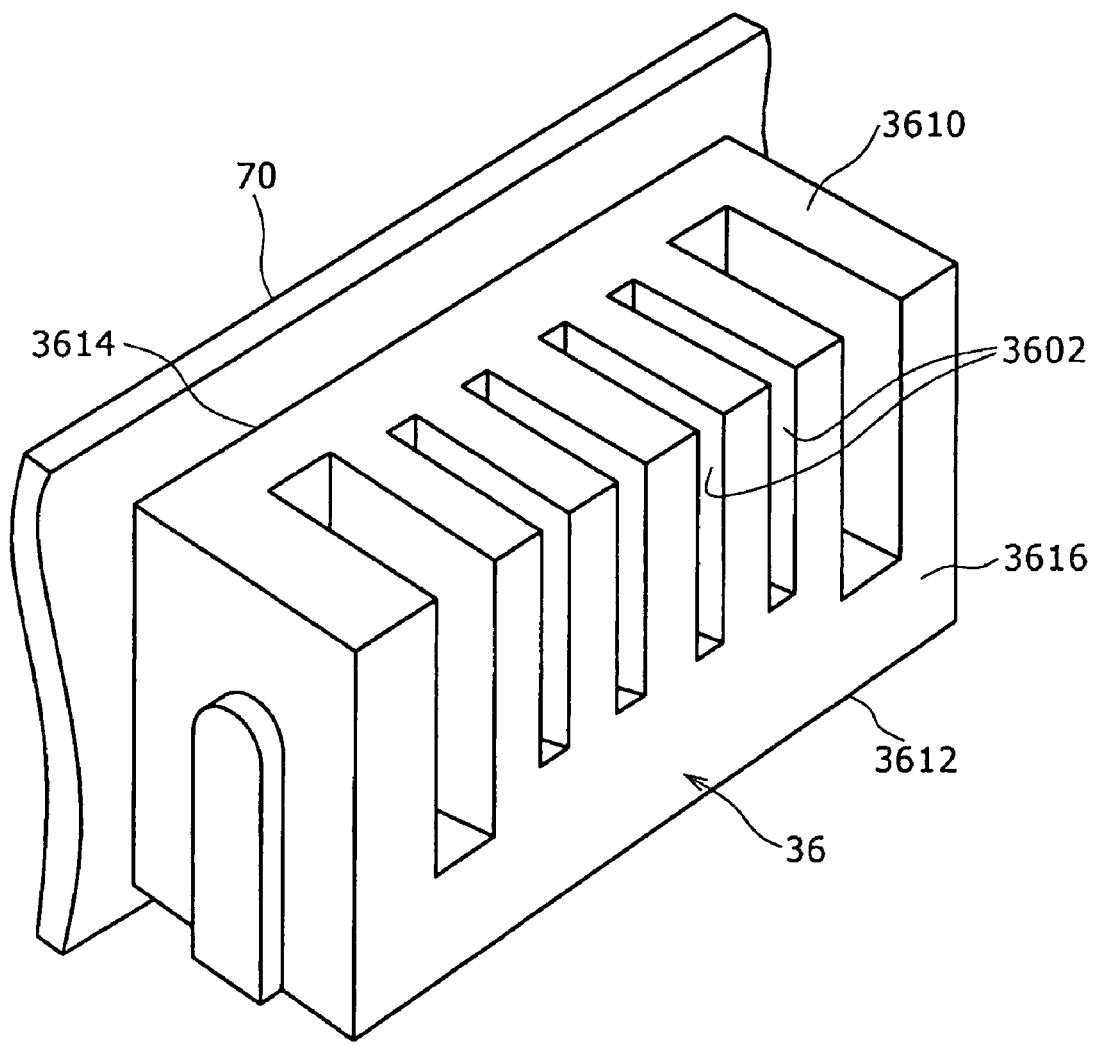
FIGS. 26 and 27 are perspective views of the connector.
Figure 27:
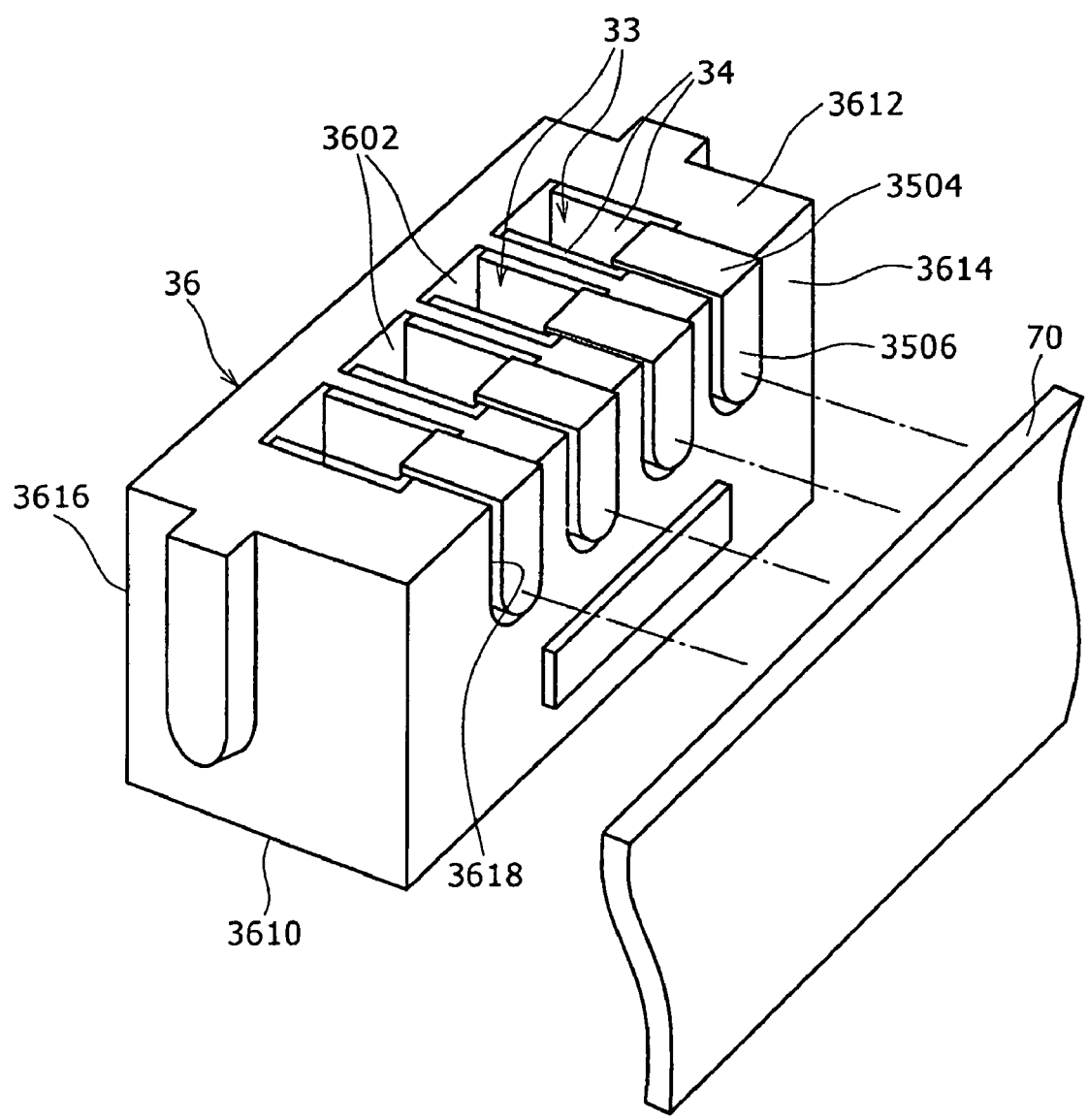
Figure 28:
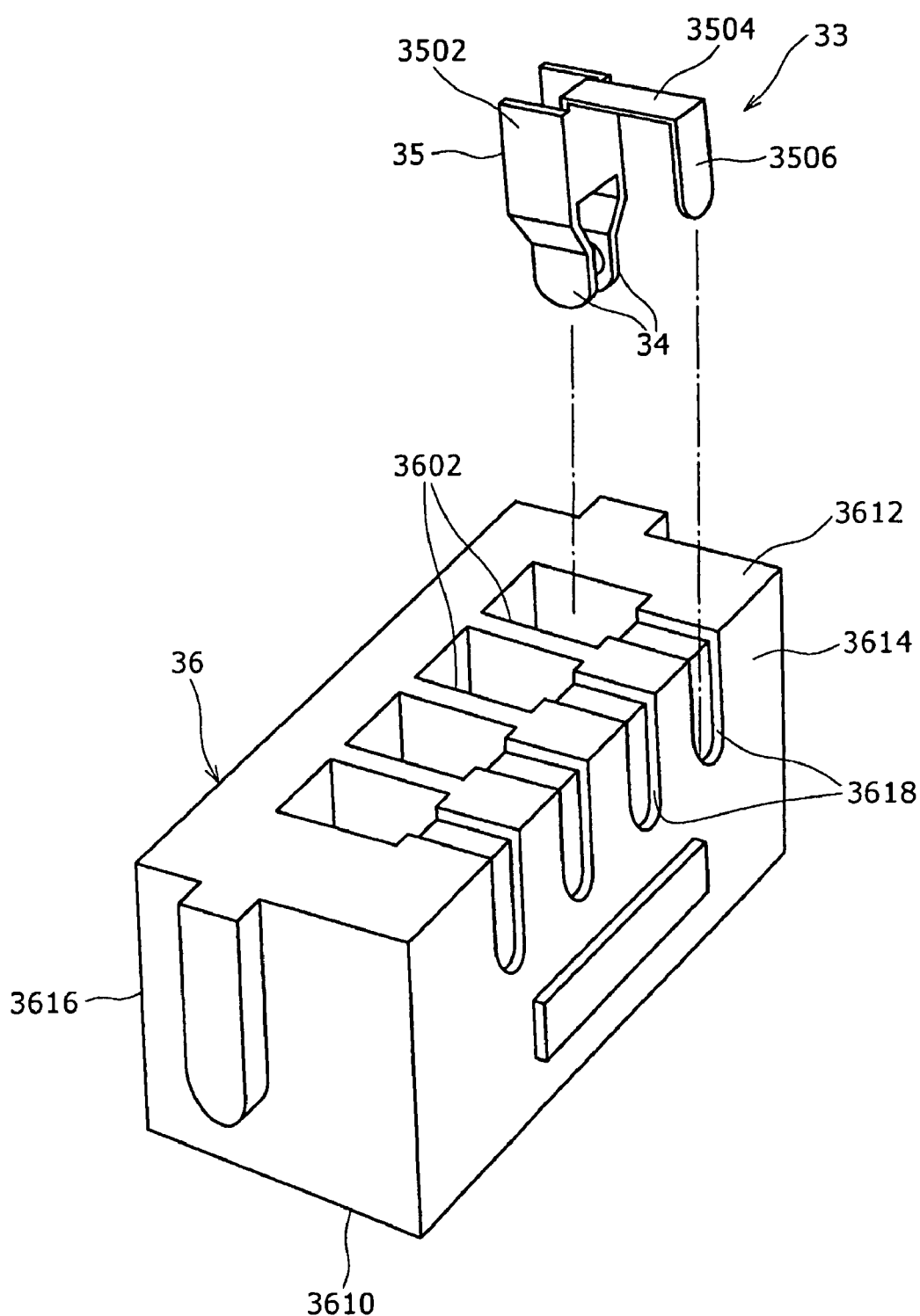
FIG. 28 is an exploded perspective view of the connector.

Referring to FIGS. 26 to 28, the terminal forming member 36 has a lower face 3610 disposed in an opposing relationship to the lower wall 10D, an upper face 3612 disposed in an opposing relationship to the upper wall 10C, a rear face 3614 joined to the printed circuit board 70, and a front face 3616 facing forwardly of the case 10.

A plurality of grooves 3602 are formed in a spaced relationship from each other in the widthwise direction of the terminal forming member 36 from the front face 3616 to the lower face 3610 and extend in the thicknesswise direction. The grooves 3602 are open also to the upper face 3612 as seen in FIGS. 26 and 28. In particular, the grooves 3602 are open to the upper face 3612 with a width greater than those to the front face 3616 and the lower face 3610.

Further, as seen in FIG. 28, a plurality of recesses 3618 are formed on the upper face 3612 and the rear face 3614 of the lower face 3610 such that they individually connect to the grooves 3602.

The contact section 33 is formed from a plurality of pairs of contact pieces 34 juxtaposed in a spaced relationship in the widthwise direction such that the contact pieces 34 in each pair are opposed to each other in the widthwise direction and are open forwardly and downwardly. In the present embodiment, the contact pieces 34 are disposed such that they form side faces of the grooves 3602 of the terminal forming member 36.

Figure 29:
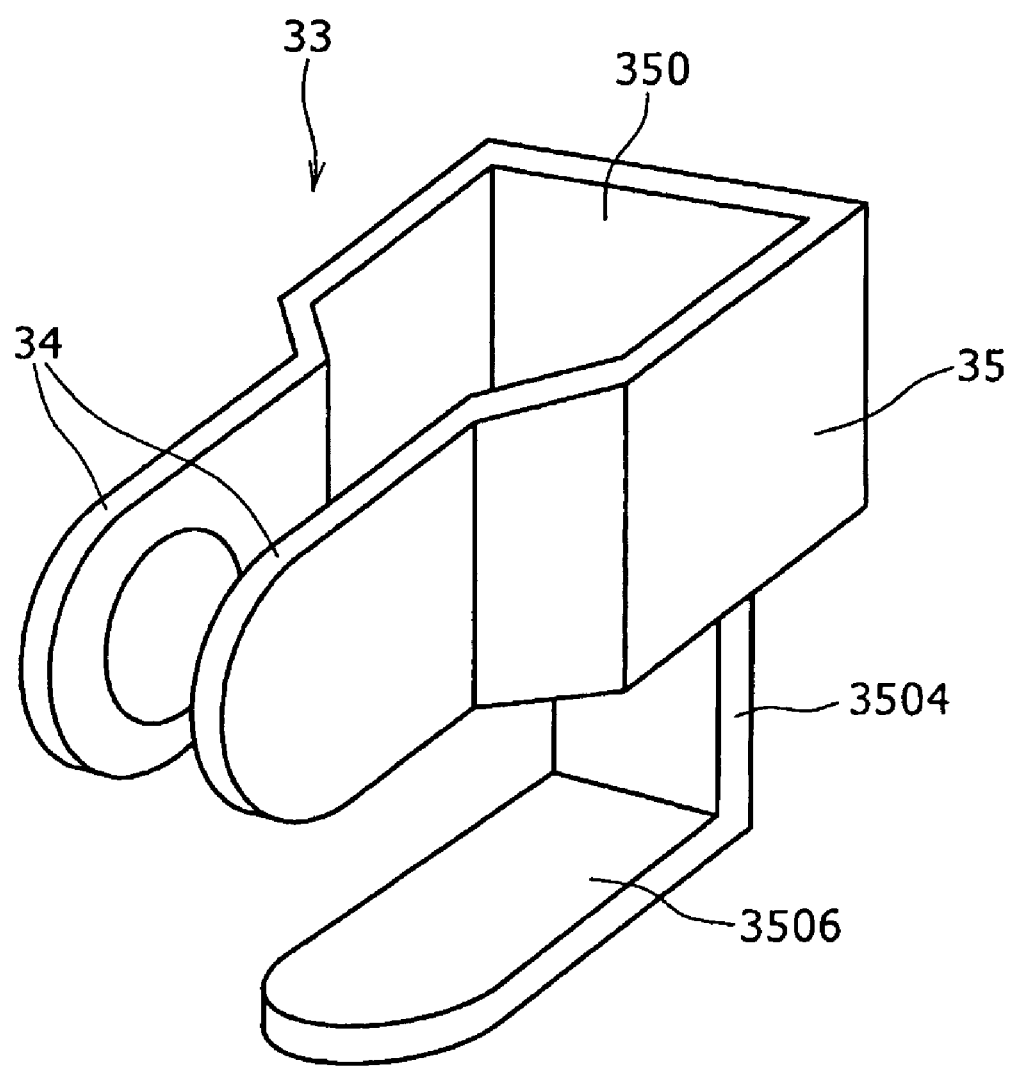
FIG. 29 is a perspective view of a connection terminal of the connector.
Figure 30:
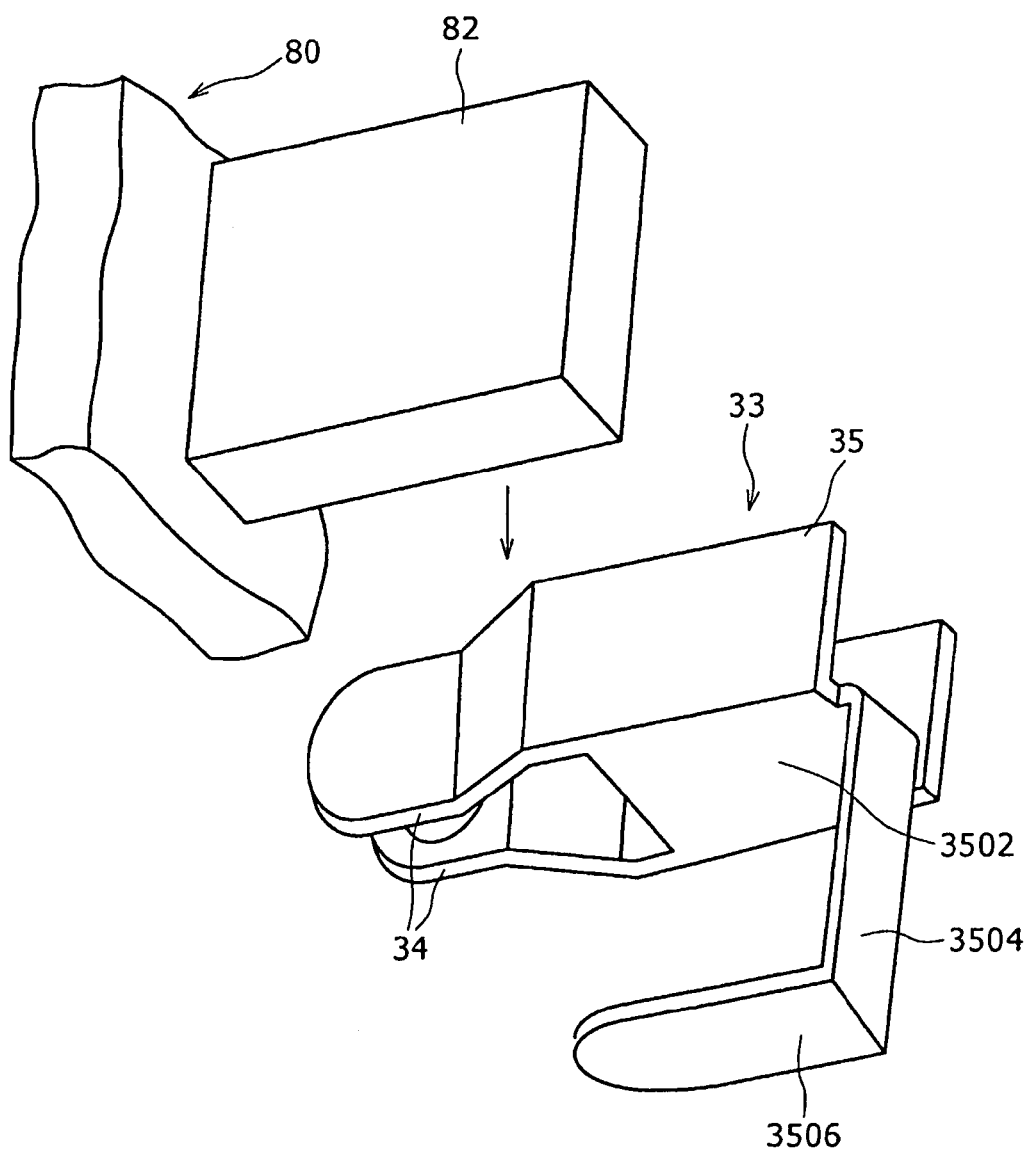
FIG. 30 is a schematic perspective view illustrating connection between the connection terminal of the connector and a contact of a counterpart connector.

The contact pieces 34 in each pair are provided integrally on a resilient contact forming member 35 made of a conductive material as seen in FIGS. 28 to 30.

The contact forming member 35 has a pair of contact pieces 34 opposing to each other, a base portion 3502 interconnecting the contact pieces 34, a first extension 3504 extending from the base portion 3502, and a second extension 3506 extending perpendicularly from an end of the first extension 3504.

Referring to FIG. 28, the pair of contact pieces 34 and the base portion 3502 of the contact forming member 35 are assembled such that they are inserted into a groove 3602 from above the upper face 3612 of the terminal forming member 36 until the base portion 3502 is fitted into the groove 3602 and the first extension 3504 and the second extension 3506 are inserted into the corresponding recess 3618 of the upper face 3612 and the rear face 3614 of the terminal forming member 36.

The connector 30 that the contact forming members 35 are attached to the terminal forming member 36 in this manner is soldered at the second extensions 3506, which are positioned in the recesses 3618 of the rear face 3614, to conductor portions of the printed circuit board 70.

It is to be noted that, in the state that the contact forming members 35 are incorporated in the terminal forming member 36, the first extension 3504 and the second extension 3506 of each of the contact forming members 35 are disposed in a spaced relationship from the bottom face of the recess 3618.

Accordingly, when a counterpart side connector 80 is coupled to and removed from the connector 30 as seen in FIG. 30, that is, when each contact piece 82 of the counterpart side connector 80 is inserted between and removed from between a pair of contact pieces 34 of the connector 30, force applied to the connector 30 is absorbed by the resiliency of the first extension 3504 so that it may not be applied to the location at which the second extension 3506 is soldered to the printed circuit board 70.

Therefore, even if dispersion appears in the positioning accuracy when the connector 30 is mounted on the printed circuit board 70, inadvertent force which may be applied to the connector 30 or the printed circuit board 70 can be reduced or eliminated advantageously.

From this, flow soldering which is likely to suffer from dispersion in the positioning accuracy when the connector 30 is mounted on the printed circuit board 70 can be used advantageously. Where reflow soldering is used, a connector which can be mounted on a plane and has a small occupation area when compared with a connector which has leads which project therefrom and are soldered by manual operation and hence has a large occupation area can be used for the connector 30. Consequently, the printed circuit board 70 can be reduced in size and hence the battery 2 can be reduced in size.

LSIs and electronic parts which form a control circuit are mounted on the printed circuit board 70. The control circuit has functions of transmitting and receiving data of characteristics and identification information of the battery 2 to and from a control section of the electronic apparatus through the contact pieces 34 for data communication of the connector 30 and supervising output voltages, output current, and so forth of the battery cells 40 through the conductive portions 72, 74, and 76.

Referring to FIGS. 17 and 21, the second side piece 52 is connected at one end thereof to the first side piece 51 and formed such that it extends over the overall length of one of the side faces 4006 of the sheath can 42 of the first battery cell 40A and extends up to the side face 4006 of the second battery cell 40B rather near to the fourth side piece 54. The second side piece 52 is connected at a portion rather rear to an end thereof to an end portion of the fourth side piece 54.

A second engaging recess 5202 and a third engaging recess 5204 for engaging with the conductive plate 60 are formed in a spaced relationship in the extension direction of the second side piece 52 on the second side piece 52.

Further, an opening 5206 is formed in the second engaging recess 5202 rather near to the first side piece 51 such that the positive terminal 44 of the first battery cell 40A can project therethrough. It is to be noted that the third engaging recess 5204 is formed with a size with which the positive terminal 44 can be fitted into the opening 5206.

Referring to FIGS. 16 and 21, the third side piece 53 is formed separately from the first side piece 51 and extends along one of the side faces 4006 of the sheath can 42 of the first and second battery cells 40A and 40B. The third side piece 53 is connected at an intermediate portion thereof to an end portion of the fourth side piece 54.

It is to be noted that the second side piece 52 and the third side piece 53 are disposed in a spaced relationship from each other by a distance corresponding to the dimension between that one of the side faces 4006 which includes the positive terminals 44 of the battery cells 40 and that one of the side faces 4006 which opposes to the side face 4006. Consequently, when the battery cells 40 are inserted into the first and second battery accommodating chambers 50A and 50B, the second side piece 52 and the third side piece 53 are individually applied to the side faces 4006 of the sheath cans 42 of the battery cells 40.

An opening 5302 for allowing the positive terminal 44 of the second battery cell 40B to project therethrough is formed at a portion of the third side piece 53 spaced away from the fourth side piece 54. The opening 5302 is formed with a size which allows the positive terminal 44 to be fitted in the opening 5302.

Further, a first engaging recess 5304 for engaging with the conductive plate 60 is formed on the third side piece 53.

Figure 18:
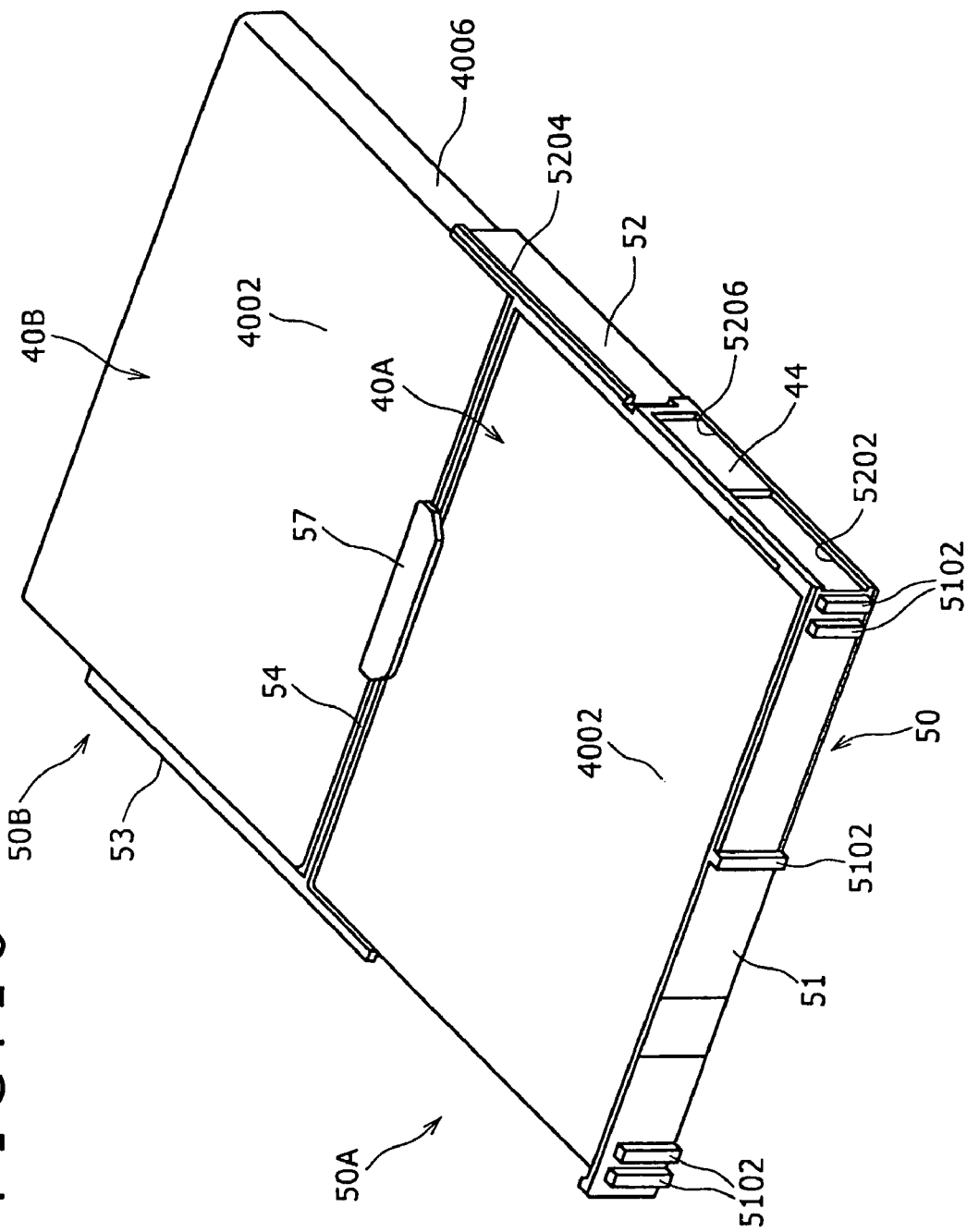

Referring to FIGS. 18 and 21, the fourth side piece 54 is configured so as to be applied to those two ones of the side faces 4006 of the battery cell 40 which do not include the positive terminal 44 together with the first side piece 51.

The fourth side piece 54 is formed to extend over the overall length of the battery cells 40 similarly to the first side piece 51.

Referring to FIGS. 16 and 19, the edge pieces 56 project from edges of the four side pieces 51, 52, 53, and 54 and have a width with which they are applied to locations rather near to edges of the lower face 4004 of the first and second battery cells 40A and 40B.

The edge piece 56 which projects from the edge of the fourth side piece 54 has an opening 5604 formed at an intermediate portion thereof in the extension direction.

Further, edge pieces 57 are formed at an intermediate portion of the fourth side piece 54 such that they are applied to edges of the upper face 4002 of the two battery cells 40 which are adjacent each other.

It is to be noted that the edge pieces 56 are formed in a rectangular framework shape such that they extend along the four sides of the lower face 4004 of the first battery cell 40A. Accordingly, the lower face 4004 is exposed at portions thereof except the four edge portions through an opening 5602 at the center of the four edge pieces 56. Further, the lower face 4004 of the second battery cell 40B is exposed at portions thereof other than the edge piece 56 of the third side piece 53 and the edge piece 56 of the fourth side piece 54.

In particular, where the first and second battery cells 40A and 40B are accommodated in the holding member 50, the upper face 4002 of the first and second battery cells 40A and 40B is open at all portions of the locations to which the edge pieces 57 are applied and the lower face 4004 has, although the edge pieces 56 exist, a cutaway portion formed among them for allowing a central portion to be exposed therethrough so that, when the battery cells 40 expand upon charging thereof, the expansion is permitted.

Further, the first and second battery cells 40A and 40B are inserted into and removed from the first and second battery accommodating chambers 50A and 50B through a portion of the holding member 50 at which the edge pieces 56 are not formed.

The conductive plate 60 includes a positive terminal connecting thin plate 60A for interconnecting the positive terminals 44 of the two battery cells 40 electrically connected in series to each other and the connector 30, and a negative terminal connecting thin plate 60B for interconnecting the negative terminals 46 of the two battery cells 40 electrically connected in series to each other and the connector 30.

The positive terminal connecting thin plate 60A and the negative terminal connecting thin plate 60B are both formed from a conductive material.

The positive terminal connecting thin plate 60A includes a first thin plate 61 and a second thin plate 62 disposed on the side on which the third side piece 53 is positioned, and a third thin plate 63 disposed on the side on which the second side piece 52 is positioned.

More particularly, the positive terminal connecting thin plate 60A includes a first thin plate 61 connected to the positive terminal 44 of the second battery cell 40B, a second thin plate 62 attached to the first thin plate 61 and connected to the negative terminal 46 of the first battery cell 40A, and a third thin plate 63 joined to the positive terminal 44 of the first battery cell 40A and connected to the conductive portion 72 of the printed circuit board 70.

The first thin plate 61 has an extension 6102 passing above the edge piece 56 connecting to the fourth side piece 54 and extending above the edge piece 56 connected to the third side piece 53, and two positive terminal joining bent lugs 6104 extending perpendicularly from one end of the extension 6102 for being joined to the positive terminal 44 of the second battery cell 40B. The first thin plate 61 further has two thin plate joining bent lugs 6106 extending perpendicularly from an intermediate portion of the extension 6102 above the second thin plate 62, and a conductive portion joining bent lag 6108 extending perpendicularly from the other end of the extension 6102 and connected to the conductive portion 76 for a midpoint of the printed circuit board 70.

One of the two positive terminal joining bent lugs 6104 of the first thin plate 61 is joined to the positive terminal 44 of the second battery cell 40B by welding.

The reason why two such positive terminal joining bent lugs 6104 and two such thin plate joining bent lugs 6106 are provided is that it is possible to set only one of the bent portions and cut away the one bent portion upon exchange of the battery cell 40 such that the remaining bent portion can be used.

The conductive portion joining bent lag 6108 of the first thin plate 61 is joined to the conductive portion 76 for a midpoint of the printed circuit board 70 by welding. Consequently, in the present embodiment, it is possible to utilize part of the positive terminal connecting thin plate 60A to supply the potential at the joining location of the positive terminal 44 and the negative terminal 46 of each of the two battery cells 40 connected to each other to the conductive portion 76 of the printed circuit board 70 such that output voltages or output current of the two battery cells 40 is supervised by the control circuit of the printed circuit board 70.

The second thin plate 62 is disposed such that a portion thereof extends over the overall length on the side face 4006 of the first battery cell 40A at a location at which the third side piece 53 does not exist while the remaining portion extends on the third side piece 53 and is engaged with the first engaging recess 5304 of the third side piece 53.

The second thin plate 62 includes two thin plates 6202 made of a metal material and a thermistor 6204 interposed between the thin plates 6202. In the present embodiment, the thermistor 6204 is formed from a PTC (Positive Temperature Coefficient) thermistor. The PTC thermistor has a resistance value which exhibits such a positive characteristic that it increases as the temperature rises. Thus, the PTC thermistor has a resistance value of a positive characteristic that it increases suddenly as excessive current flows therethrough to suppress the current to flow thereby to protect the electronic apparatus in which the battery cells 40 and the battery 2 is incorporated.

A portion of an increased thickness formed by one of the thin plates 6202 and the thermistor 6204 made of metal placed one on the other extends on the side face 4006 of the first battery cell 40A at which the third side piece 53 does not exist, and an end portion of the second thin plate 62 positioned near to the first side piece 51 is joined to the side face 4006 of the first battery cell 40A by welding, that is, joined to the negative terminal 46 of the first battery cell 40A.

Further, a portion of the second thin plate 62 which extends along the first engaging recess 5304 of the third side piece 53 is formed only from the single thin plate 6202 and is engaged with the first engaging recess 5304.

The two thin plate joining bent lugs 6106 described above are placed on the portion of the second thin plate 62 engaged with the first engaging recess 5304, and one of the thin plate joining bent lugs 6106 is joined to the second thin plate 62 by welding.

In the present embodiment, in the state that the second tin plate 62 is engaged with the first engaging recess 5304, the first thin plate 61 and the second thin plate 62 which form the positive terminal connecting thin plate 60A are positioned in the direction perpendicular to that one of the side faces 4006 of the sheath can 42 to which the third side piece 53 is applied. Consequently, assembly of the first thin plate 61 and the second thin plate 62 can be performed simply.

Further, in the present embodiment, in the state that the second thin plate 62 is engaged with the first engaging recess 5304 and the two thin plate joining bent lugs 6106 are placed on the second thin plate 62, the surface of the thin plate joining bent lugs 6106 is positioned in flush with the surface of the third side piece 53 at any other portion than the portion at which the first engaging recess 5304 is formed or at a location lower than the surface of the third side piece 53. Consequently, the unit of the battery cells 40 held by the holding member 50 and having the conductive plate 60 assembled thereto can be miniaturized.

Figure 11:
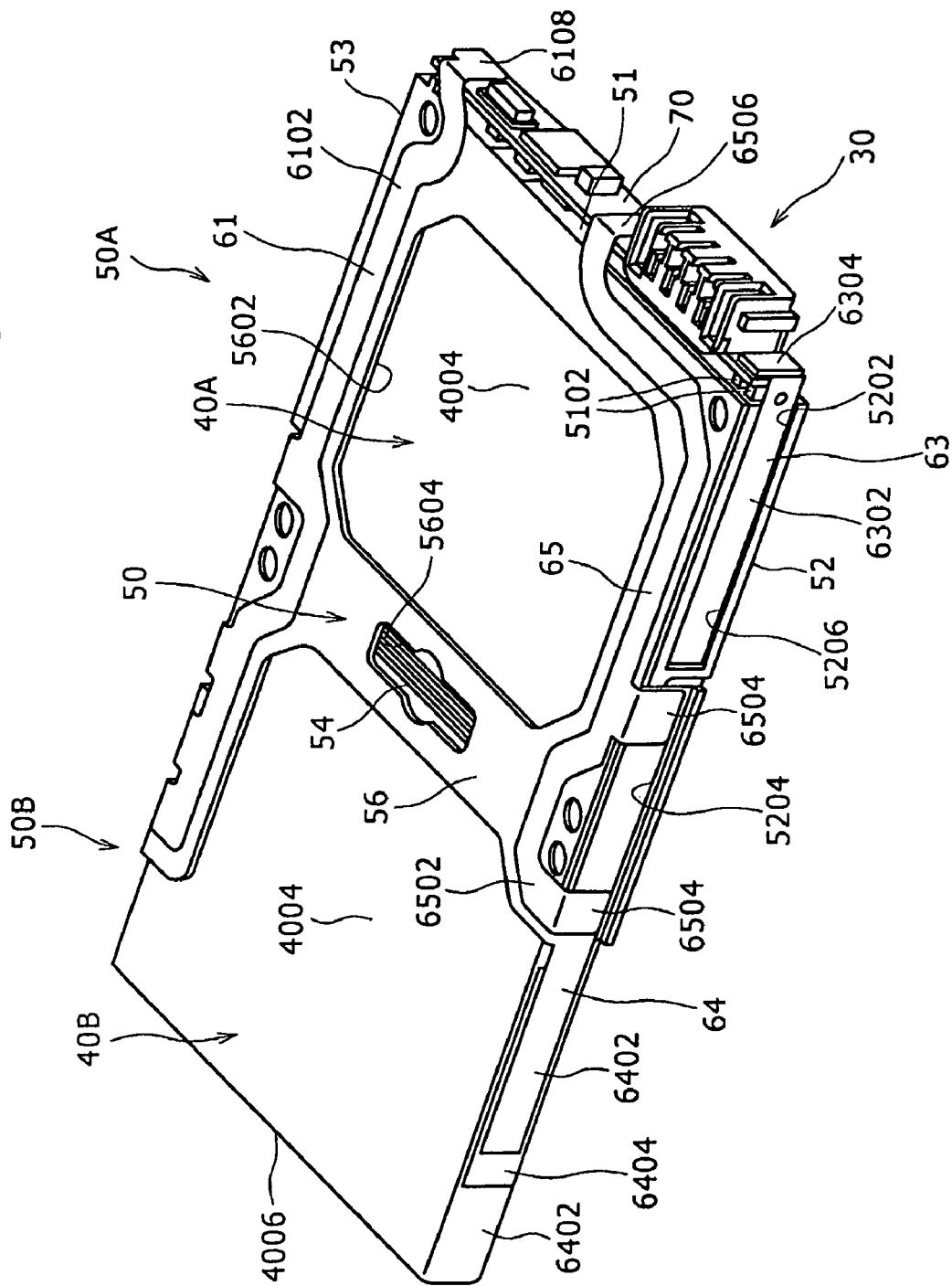
FIG. 11 is a perspective view of the battery cell section of the battery with the case removed but as viewed in a different direction from that of FIG. 10.
Figure 12:
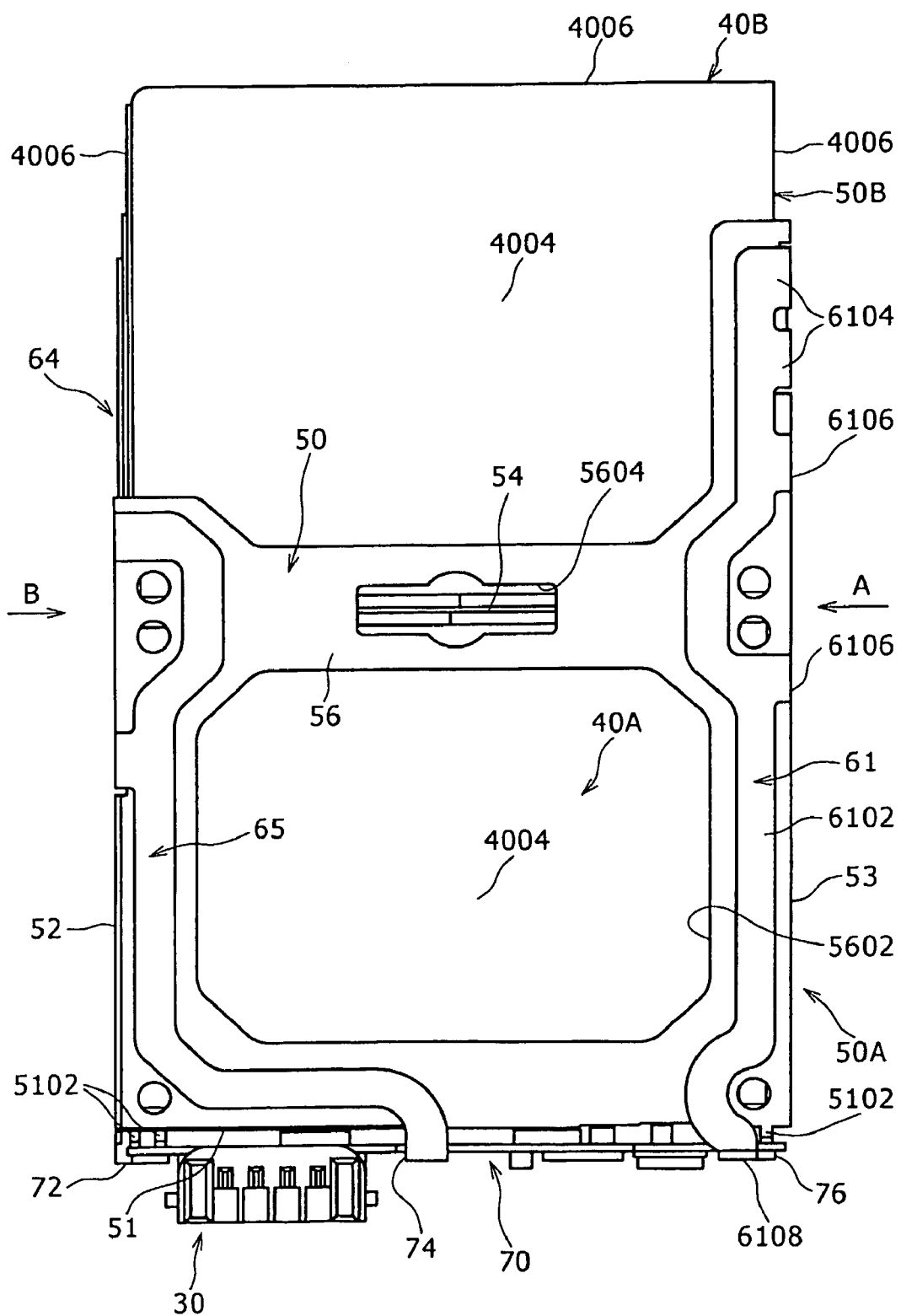
FIG. 12 is a bottom plan view of the battery cell section of the battery with the case removed.
Figure 13:
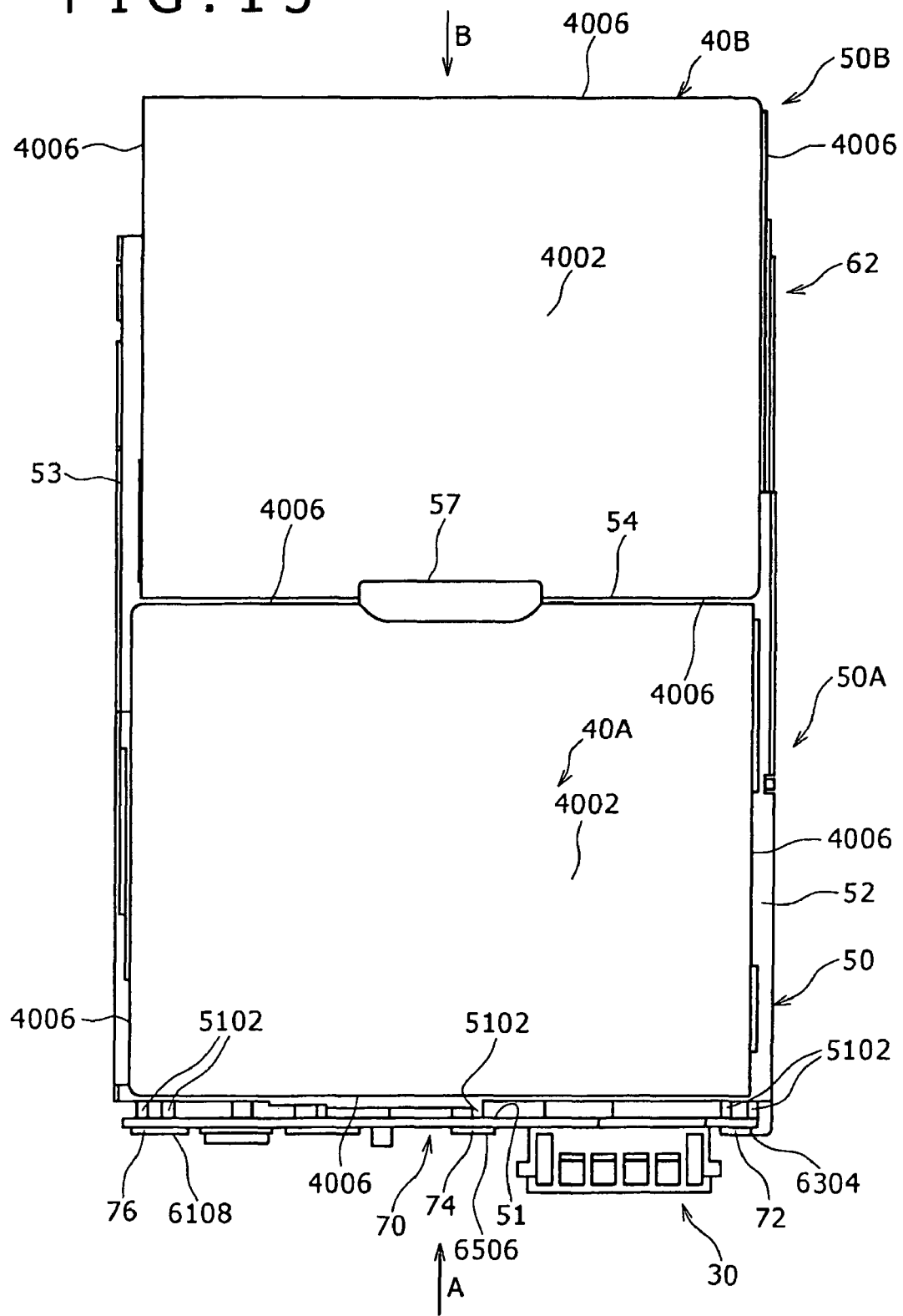
FIG. 13 is a top plan view of the battery cell section of the battery with the case removed.
Figure 15A:
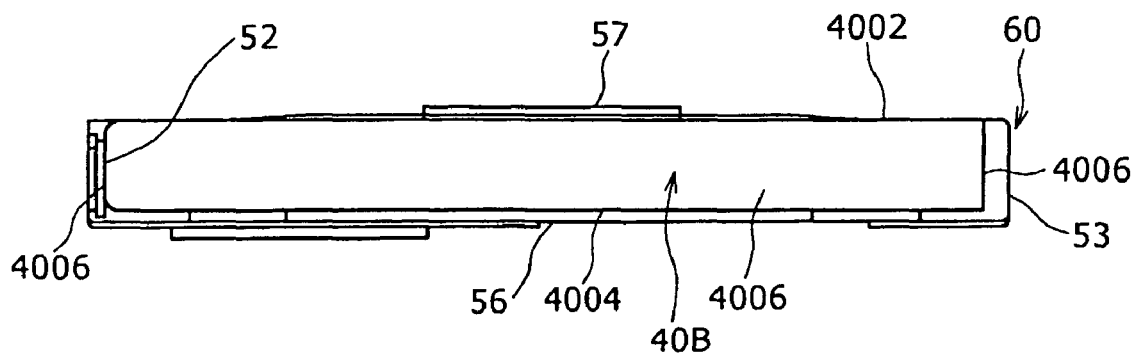
FIG. 15A is a view as viewed in the direction indicated by an arrow mark A in FIG. 13.
Figure 15B:
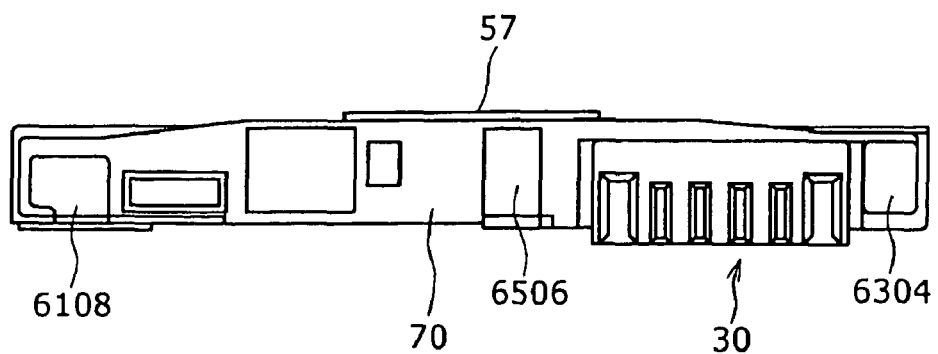
FIG. 15B is a view as viewed in the direction indicated by an arrow mark B in FIG. 13.

Referring to FIG. 11, the third thin plate 63 has an extension 6302 extending over the overall length on the second engaging recess 5202 of the second side piece 52 and disposed so as to cover the opening 5206, and a conductive portion joining bent lug 6304 extending perpendicularly from one end of the extension 6302 and connected to the conductive portion 72 for the positive pole of the printed circuit board 70.

Above the second engaging recess 5202, the extension 6302 is joined at a location thereof rather near to an end portion in the extension direction to a location of the positive terminal 44 of the first battery cell 40A rather near to an end portion (location rather near to an end portion of the positive terminal 44 on the side spaced from the first side piece 51). The reason why the extension 6302 is jointed to the location rather near to the end portion of the positive terminal 44 is that, when any of the battery cells 40 is exchanged, the joined portion can be cut such that a new end portion of the extension 6302 can be joined to a location of the positive terminal 44 rather near to the other end portion.

In the present embodiment, in the state that the third thin plate 63 is engaged with the second engaging recess 5202, the third thin plate 63 is positioned in the direction perpendicular to the side face 4006 of the sheath can 42 to which the second side piece 52 is applied.

Further, in the present embodiment, in the state that the third thin plate 63 is engaged with the second engaging recess 5202, the surface of the third thin plate 63 is positioned on the same plane as the surface of the second side piece 52 other than the location at which the second engaging recess 5202 is formed or is positioned at a location lower than the surface of the second side piece 52.

The conductive portion joining bent lug 6304 is joined to the conductive portion 72 for the positive pole of the printed circuit board 70 by welding.

Consequently, the positive terminal 44 of the second battery cell 40B, negative terminal 46 of the first battery cell 40A, positive terminal 44 of the first battery cell 40A, and connector 30 are connected to each other by the positive terminal connecting thin plate 60A.

Referring to FIGS. 11 and 19, the negative terminal connecting thin plate 60B includes a fourth thin plate 64 and a fifth thin plate 65 disposed on the side on which the second side piece 52 is positioned.

More particularly, the negative terminal connecting thin plate 60B includes a fourth thin plate 64 connected to the negative terminal 46 of the second battery cell 40B, and a fifth thin plate 65 attached to the fourth thin plate 64 and connected to the conductive portion 74 of the printed circuit board 70.

The fourth thin plate 64 extends at a portion thereof over the overall length on the side face 4006 of the second battery cell 40B. The remaining portion of the fourth thin plate 64 is extended over the second side piece 52 and is in engagement with the third engaging recess 5204 of the second side piece 52.

The fourth thin plate 64 includes, similarly to the second thin plate 62, two thin plates 6402 made of a metal material, and a thermistor 6404 interposed between the thin plates 6402. In the present embodiment, the thermistor 6404 is formed from a PTC thermistor similarly to the thermistor 6204 described hereinabove.

A portion of an increased thickness formed by the thin plate 6402 and the thermistor 6404 of metal placed one on the other extends on the side face 4006 of the second battery cell 40B at which the second side piece 52 does not exist, and an end portion of the fourth thin plate 64 positioned remotely from the first side piece 51 is joined to the side face 4006 of the second battery cell 40B by welding, that is, joined to the negative terminal 46 of the second battery cell 40B.

Further, a portion of the fourth thin plate 64 which extends along the third engaging recess 5204 of the second side piece 52 is formed only from the single thin plate 6402 and is engaged with the third engaging recess 5204.

The fifth thin plate 65 includes an extension 6502 passing above the edge piece 56 connecting to the fourth side piece 54 and extending on the edge piece 56 connected to the second side piece 52, two thin plate joining bent lugs 6504 extending perpendicularly from one end of the extension 6502 and capable of being joined to the fourth side piece 54, and a conductive portion joining bent lug 6506 extending perpendicularly from the other end of the extension 6502 and connected to the conductive portion 74 of the printed circuit board 70.

One of the two thin plate joining bent lugs 6504 of the fifth thin plate 65 is joined to a portion of the fourth thin plate 64 which is positioned above the third engaging recess 5204 by welding.

The reason why two such thin plate joining bent lugs 6504 are provided is that it is possible to use only one of the bent portions and cut away the one bent portion upon exchange of the battery cells 40 such that the remaining bent portion can be used.

The conductive portion joining bent lug 6506 of the fifth thin plate 65 is joined to the conductive portion 74 of the printed circuit board 70 by welding.

In the present embodiment, in the state that the fourth thin plate 64 is engaged with the third engaging recess 5204, the fourth thin plate 64 and the fifth thin plate 65 which form the negative terminal connecting thin plate 60B are positioned in the direction perpendicular to the side face 4006 of the sheath can 42 to which the second side piece 52 is applied. Consequently, assembly of the fourth thin plate 64 and the fifth thin plate 65 can be performed simply.

Further, in the present embodiment, in the state that the fourth thin plate 64 is engaged with the third engaging recess 5204 and the two thin plate joining bent lugs 6504 are placed on the fourth thin plate 64, the surface of the thin plate joining bent lugs 6504 is positioned on the same plane as the surface of the second side piece 52 other than the location at which the third engaging recess 5204 is formed or is positioned at a location lower than the surface of the second side piece 52. Consequently, the unit of the battery cells 40 held by the holding member 50 and having the conductive plate 60 assembled thereto is miniaturized.

Where the holding member 50 is provided in this manner, the battery cells 40 are held by the holding member 50 while they are isolated from each other, and the conductive plate 60 is disposed along the holding member 50 by the holding member 50 while the conductive plate 60 is isolated from the battery cell 40. Therefore, when compared with an alternative case that insulating paper or a double-sided adhesive tape is used to assure isolation between the battery cells, fixation of the battery cells to each other, and isolation between the battery cells and the conductive plate, miniaturization of the battery 2 can be anticipated and the number of parts can be reduced significantly and besides assembly can be simplified. Consequently, the cost can be reduced.

Further, where the holding member 50 is provided, upon assembly of the battery 2, the first to third engaging recesses 5304, 5202, and 5204 can be utilized to dispose the conductive plate 60 simply while the conductive plate 60 is positioned on the holding member 50. Accordingly, if, in the state that the battery cell 40 is held by the holding member 50, the printed circuit board 70 is positioned and disposed at a front portion of the first side piece 51, for example, using a jig or the like, then the conductive plate 60 is positioned and disposed on the holding member 50 making use of the first to third engaging recesses 5304, 5202, and 5204. Accordingly, welding can be performed simply in the state that the printed circuit board 70 and the conductive plate 60 are positioned, which is advantageous for simplification of assembly.

Further, where the holding member 50 is provided, since each of the battery cells 40 in the first and second battery accommodating chambers 50A and 50B is open except peripheral portions of the upper face 4002 and the lower face 4004, even if the central portions of the upper face 4002 and the lower face 4004 are swollen to increase the thickness upon charging of the battery cells 40 or the like, the thickness increase can be absorbed. Further, since the holding member 50 does not exist at central portions of the swollen upper face 4002 and lower face 4004, the gaps 1212 and 1213 between the inner face of the case 10 and the battery cells 40 can be utilized effectively. This is advantageous when it is tried to prevent the case 10 of the battery 2 from being swollen in the thicknesswise direction.

Further, the positive terminal connecting thin plate 60A which interconnects the positive terminal 44 of the second battery cell 40B and the negative terminal 46 of the first battery cell 40A is formed including the first thin plate 61 which passes a location of the edge pieces 56 connecting to the fourth side piece 54. The negative terminal connecting thin plate 60B which interconnects the negative terminal 46 of the second battery cell 40B and the conductive portion 74 of the printed circuit board 70 is formed including the first thin plate 61 and the fifth thin plate 65 which pass a location of the edge pieces 56 to which the fourth side piece 54 is connected. Even if, for example, the battery 2 is placed into a pocket and deformed in the thicknesswise direction, the external force which is applied to the joining portion of the positive terminal connecting thin plate 60A and the negative terminal connecting thin plate 60B can be reduced, which is advantageous when it is tried to prevent failure in connection.

Now, assembly of the case 10 is described.

The upper case 12 and the lower case 14 in the present embodiment are joined together by ultrasonic welding. Thus, a welding jig 200 which is used for the ultrasonic welding is described.

Figure 35:
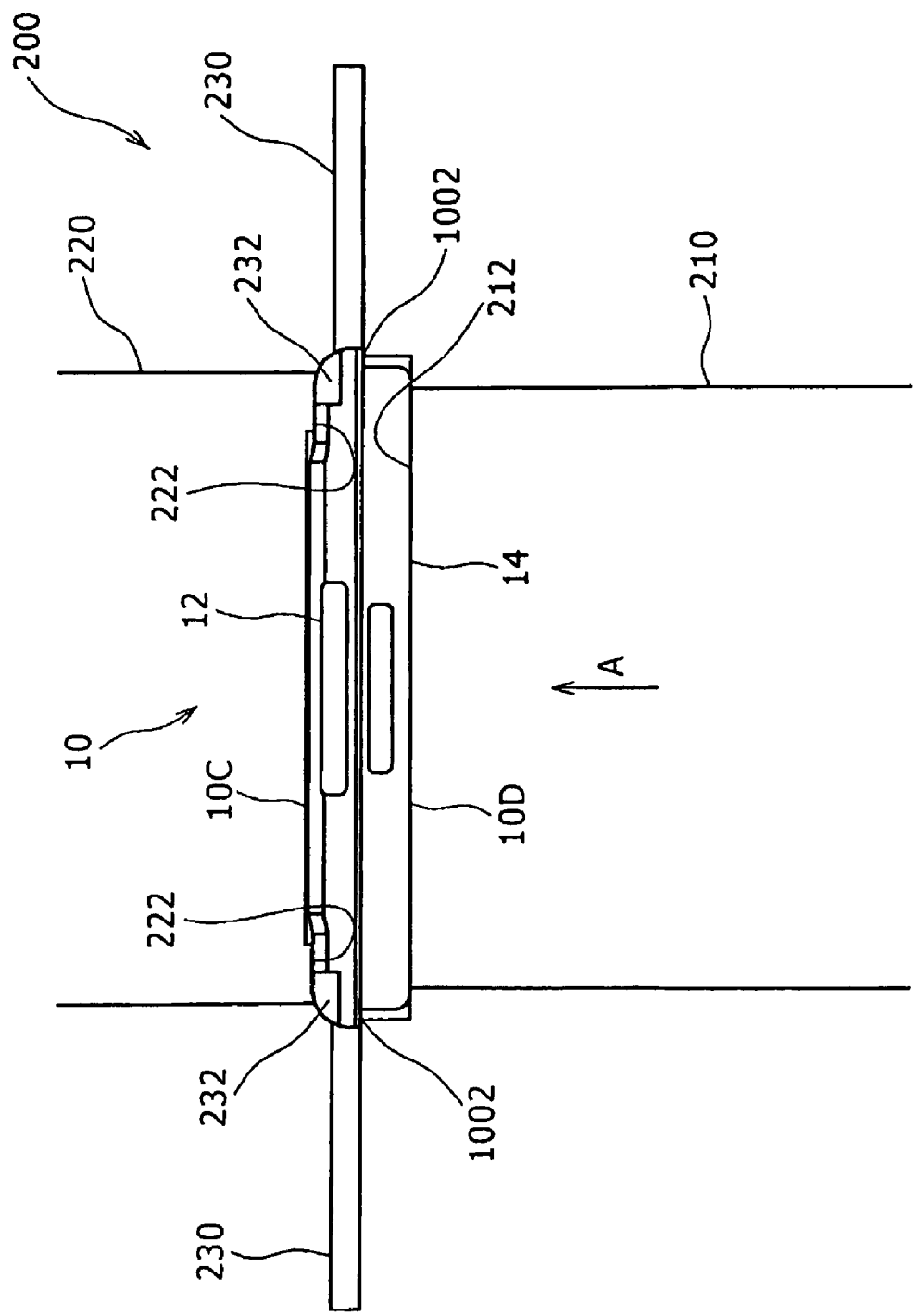
FIG. 35 is a schematic view of a welding jig.
Figure 36:
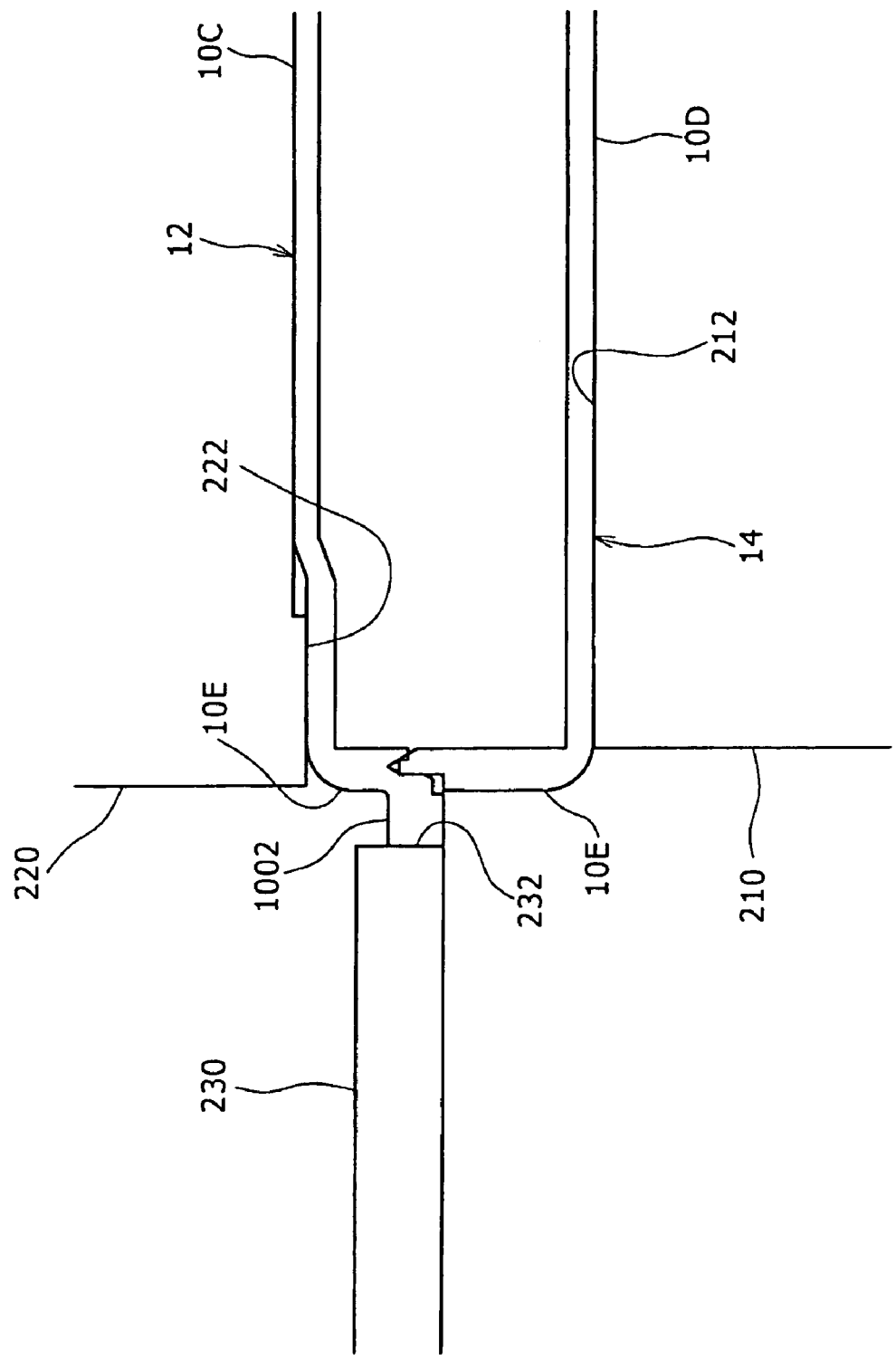
FIG. 36 is an enlarged schematic view of part of FIG. 35.
Figure 37:
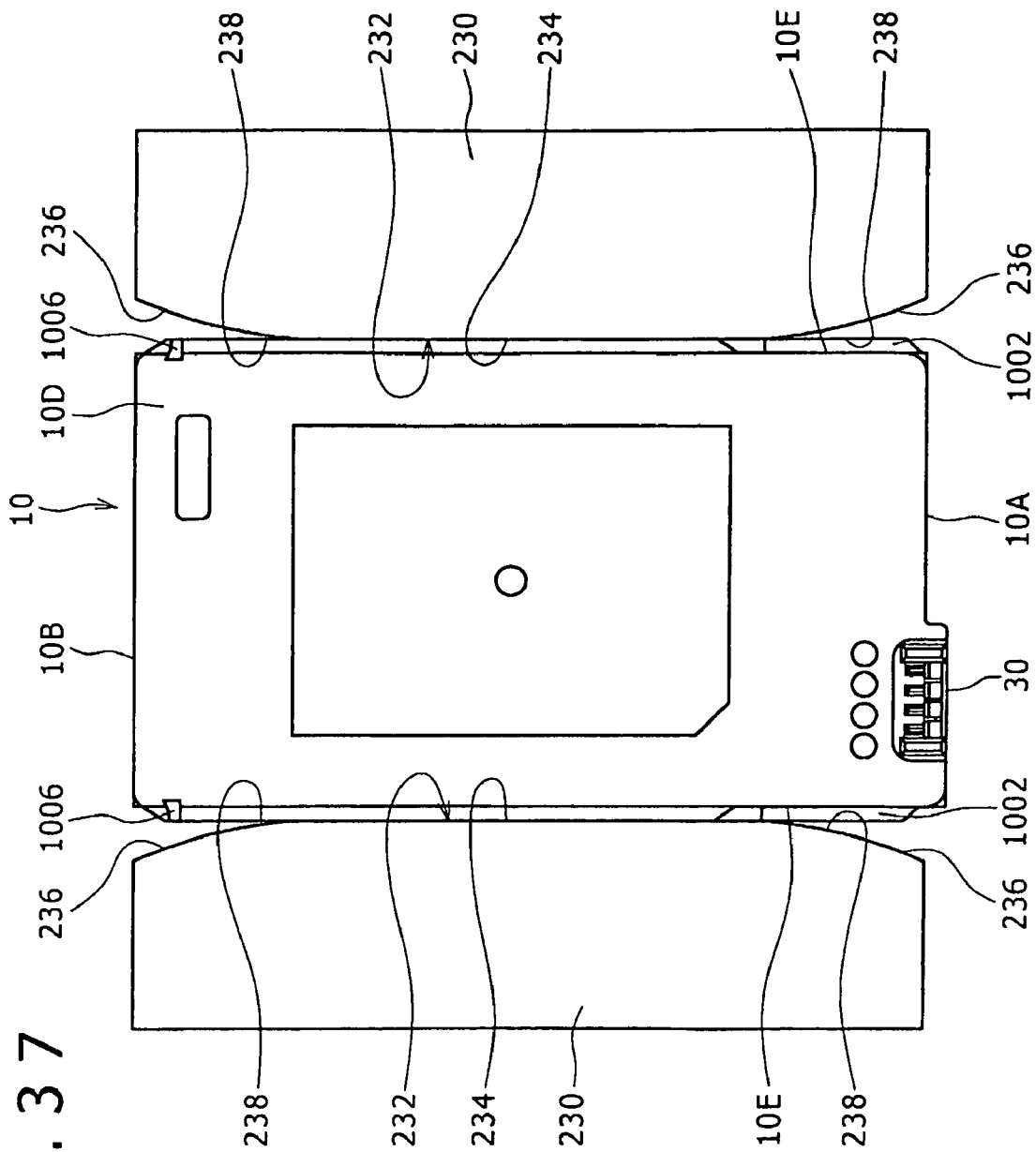
FIG. 37 is a view as viewed in the direction indicated by an arrow mark A of FIG. 35.

Referring to FIGS. 35 to 37, the welding jig 200 is shown and includes a pedestal 210, a horn 220, and two clamps 230.

The pedestal 210 has a flat receiving face 212 on which a lower wall of the lower case 14 is placed.

The horn 220 has two flat contacting faces 222 which contact with portions of an upper wall of the upper case 12 in the proximity of the opposite sides in the widthwise direction along the lengthwise direction. Ultrasonic oscillations are applied from the contacting faces 222 to the upper wall of the upper case 12.

Each of the clamps 230 has a contacting face 232 for contacting with the projecting wall 1002 of the upper case 12. Referring to FIG. 37, the contacting face 232 has a flat portion 234 for contacting with a central portion of the projecting wall 1002 in the lengthwise direction, curved portions 236 connected to the opposite ends of the flat portion 234 and curved in a direction in which they are spaced away from the projecting wall 1002 as the distance from the flat portion 234 increases, and connecting portions 238 for interconnecting the flat portion 234 and the curved portions 236.

Now, welding of the upper case 12 and the lower case 14 is described.

A unit of the battery cells 40 held by the holding member 50 and having the conductive plate 60 and the printed circuit board 70 assembled thereto is accommodated into the inside of the lower case 14, and in this state, the lower wall of the lower case 14 is placed on the receiving face 212 of the pedestal 210 as seen in FIG. 35.

Then, the upper case 12 is fitted on the lower case 14 with the side walls 10E thereof directed downwardly as seen in FIG. 33, and an end of the joining thin wall 1420 of the lower case 14 is inserted into the joining recess 1220 of the upper case 12 and the joint portions of the upper case 12 and the lower case 14 are jointed with each other.

In this state, the contacting faces 222 of the horn 220 are applied to the upper wall of the upper case 12 by predetermined pressing force as seen in FIG. 35 to establish a state that the contacting faces 232 of the clamps 230 are contacted with the projecting walls 1002 of the upper case 12.

In this state, the cutaway portions 1421 of the lower case 14 are positioned at locations of the contacting faces 232 of the clamps 230 corresponding to the connecting portions 238.

Then, the horn 220 is driven by ultrasonic oscillations to apply the ultrasonic oscillations from the contacting faces 222 of the horn 220 to the upper case 12.

Figure 34:
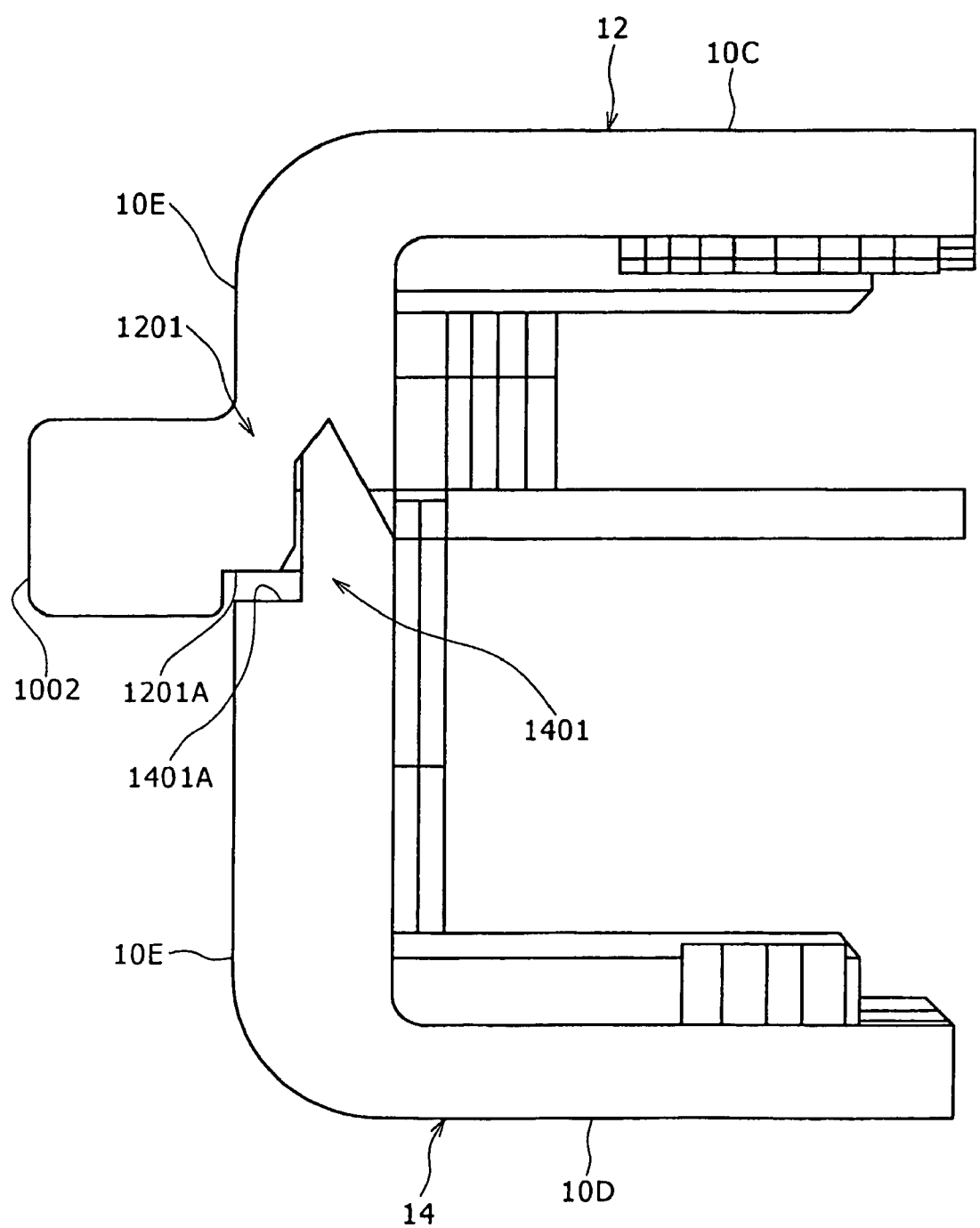
FIG. 34 is a schematic view showing joint portions of the upper case and the lower case after welded.

Consequently, the locations at which the joining recess 1220 of the upper case 12 and the joining thin wall 1420 of the lower case 14 contact with each other are oscillated to generate heat, and the joining recess 1220 and the joining thin wall 1420 are melted and welded to each other as seen in FIG. 34.

It is to be noted that, while the curved portions 236 of the clamps 230 are spaced from the end faces of the projecting wall 1002, since the opposite ends of the side walls 10E of the upper case 12 and the lower case 14 corresponding to the curved portions 236 are connected to the front side wall 10A and the rear side wall 10B of the upper case 12 and the lower case 14 and reinforced by the front side wall 10A and the rear side wall 10B, respectively, the opposite side portions of the side walls 10E in the extension direction are not deformed outwardly in the widthwise direction.

After the welding is completed, the pressing against the upper case 12 of the horn 220 and the contact of the clamps 230 with the projecting wall 1002 are canceled, and then the case 10 that the upper case 12 and the lower case 14 are integrated with each other is removed from the welding jig 200.

According to the present embodiment, the joining thin wall 1420 is provided at the joint portion 1401 of the lower case 14 while the joining recess 1220 is provided at the joint portion 1201 of the upper case 12, and the projecting walls 1002 are provided at locations of the outer faces of the side walls 10E positioned on the outer side of the joining recess 1220 such that they extend along the joining recess 1220.

Accordingly, when the joint portions 1201 and 1401 of the upper case 12 and the lower case 14 are joined together by ultrasonic welding in the state that the welding jig 200 is contacted with the extremity of the projecting wall 1002, since the contacting faces 232 of the clamps 230 contact with the end face of the projecting wall 1002 having a higher rigidity than the side walls 10E, the contact between the contacting faces 232 of the clamps 230 and the end face of the projecting wall 1002 can be maintained. Consequently, deformation of the joint portions 1201 and 1401 of the upper case 12 and the lower case 14 can be prevented and welding of the upper case 12 and the lower case 14 can be performed with certainty.

Further, in the present embodiment, in the state that the joining thin wall 1420 is inserted in the joining recess 1220 and the joint portions 1201 and 1401 of the upper case 12 and the lower case 14 joint with each other, the location of the projecting wall 1002 which is positioned on the lower wall 10D side is positioned on the lower wall 10D side with respect to the end face 1401A at the end of the side wall 10E remaining on the upper case 12. Consequently, a gap between the end face 1201A of the side wall 10E of the upper case 12 and the end face 1401A of the side wall 10E of the lower case 14 is covered with the projecting wall 1002. Therefore, even if the magnitude of the gap varies along the lengthwise direction of the case 10, since the gap is hidden by the projecting wall 1002, a fine view of the case 10 is not damaged.

Further, the cutaway portions 1421 are formed on the joining thin wall 1420 having a length of a great dimension corresponding to the major side of a rectangular shape as viewed in plan by removing the joining thin wall 1420. Therefore, the amount by which the portions of the joining recess 1220 and the joining thin wall 1420 are melted upon welding can be limited. Consequently, excess material (mold chips) overflowing to the inside or the outside of the case 10 from the joint portions 1201 and 1401, can be suppressed. Therefore, such a situation that excess material flows out from the case 10 to damage the fine view of the case 10 can be prevented.

Further, in ultrasonic welding, the amount by which portions of the joining recess 1220 and the joining thin wall 1420 at the welded locations corresponding to the connecting portions 238 of the contacting faces 232 of the clamps 230 is likely to become greater than those at the other welded locations, and a phenomenon that excess material overflowing from the joint portions 1201 and 1401 is liable to appear is likely to occur. However, in the present embodiment, since the cutaway portions 1421 of the lower case 14 are positioned at locations corresponding to the connecting portions 238 of the contacting faces 232 of the clamps 230, appearance of excess material can be prevented further effectively. Consequently, such a situation that excess material overflows to the outside of the case 10 to damage the fine view of the case 10 can be prevented.

Further, where the outer faces of the front side wall 10A, rear side wall 10B, upper wall 10C, lower wall 10D, and two side walls 10E of the case 10 are formed, for example, from embossed faces having fine projections and depressions, if ultrasonic welding is performed with the contacting faces 232 of the clamps 230 contacted with the locations of the walls, then the embossed faces are damaged. However, since the contacting faces 232 of the clamps 230 contact with the end face of the projecting wall 1002, the embossed faces are not damaged and there is no possibility that the fine view may be damaged. Further, since the end face of the projecting wall 1002 is a sliding face when the battery 2 is loaded into a battery accommodating chamber, even if it is damaged by the contacting face 232 of the clamps 230, the damage does not stand out.

While a preferred embodiment of the present invention has been described using specific terms, such description is for illustrative purpose only, and it is to be understood that changes and variations may be made without departing from the spirit or scope of the following claims.

The invention claimed is:

1. A battery comprising:
   a case; and
   a battery cell accommodated in said case;
   wherein said case is divided in a thicknesswise direction of said battery cell into a first case and a second case;

said first and second cases have joint portions for jointing with each other;

the joint portion of one of said first and second cases has a joining thin wall formed to extend along a periphery of the joint portion and project in the thicknesswise direction;

the joint portion of the other of said first and second cases has a joining recess formed to extend along a periphery of the joint portion for receiving said joining thin wall inserted therein in a state that said joint portions of said first and second cases joint with each other;

said joining thin wall and said joining recess in which said joining thin wall is inserted while said joint portions of said first and second cases joint with each other are joined together by welding; and said the other case has a projecting wall formed at a location of an outer face positioned on the outer side of said joining recess in such a manner as to extend along said joining recess.

2. The battery according to claim 1, wherein said case has a form of a flattened rectangular plate, said first case has a rectangular lower wall facing one face of said battery cell in the thicknesswise direction and side walls extending perpendicularly from the four sides of said lower wall, said second case has a rectangular upper wall facing the other face of said battery cell in the thicknesswise direction and side faces extending perpendicularly from the four sides of said upper wall, said joint portions of said first and second cases are formed from extremities of said side walls, said joining thin wall is formed at the joint portion of said first case, and said joining recess is formed at the joint portion of said second case.

3. The battery according to claim 1, wherein said case is flattened and has a rectangular shape as viewed in plan, said first case has a rectangular lower wall facing one face of said battery cell in the thicknesswise direction and side walls extending perpendicularly from the four sides of said lower wall, said second case has a rectangular upper wall facing the other face of said battery cell in the thicknesswise direction and side faces extending perpendicularly from the four sides of said upper wall, said joint portions of said first and second cases are formed from extremities of said side walls, and said projecting wall is formed at a location of each of those of said side walls of said first or second case which correspond to the two major sides of the rectangular shape.

4. The battery according to claim 1, wherein said case is flattened and has a rectangular shape as viewed in plan, said first case has a rectangular lower wall facing one face of said battery cell in the thicknesswise direction and side walls extending perpendicularly from the four sides of said lower wall, said second case has a rectangular upper wall facing the other face of said battery cell in the thicknesswise direction and side faces extending perpendicularly from the four sides of said upper wall, said joint portions of said first and second cases are formed from extremities of said side walls, and said projecting wall is formed at a location of each of those of said side walls of said first or second case which correspond to the two major sides of the rectangular shape in such a manner as to extend at a uniform projecting height from the side wall.

5. The battery according to claim 1, wherein said case is flattened and has a rectangular shape as viewed in plan, and a cutaway portion is formed at each of locations at which said joining thin wall positioned on the two major sides of the rectangular shape is positioned rather near to the minor sides of the rectangular shape by removing the joining thin wall.

6. The battery according to claim 1, wherein said case has a form of a flattened rectangular plate, said first case has a rectangular lower wall facing one face of said battery cell in the thicknesswise direction and side walls extending perpendicularly from the four sides of said lower wall, said second case has a rectangular upper wall facing the other face of said battery cell in the thicknesswise direction and side faces extending perpendicularly from the four sides of said upper wall, said joint portions of said first and second cases are formed from extremities of said side walls, said joining thin wall is formed at an inner side portion of said case at a location of the joint portion of said first case leaving an end face at an extremity of said side walls at an outer side portion of said case, and said joining recess is formed at an inner side portion of said case at a location of the joint portion of said second case leaving an end face of an extremity of said side walls at an outer side portion of said case.

7. The battery according to claim 1, wherein said case is flattened and has a rectangular shape as viewed in plan, said first case has a rectangular lower wall facing one face of said battery cell in the thicknesswise direction and side walls extending perpendicularly from the four sides of said lower wall, said second case has a rectangular upper wall facing the other face of said battery cell in the thicknesswise direction and side faces extending perpendicularly from the four sides of said upper wall, said joint portions of said first and second cases are formed from extremities of said side walls, said joining thin wall is formed at an inner side portion of said case at a location of the joint portion of said first case leaving an end face at an extremity of said side walls at an outer side portion of said case, said joining recess is formed at an inner side portion of said case at a location of the joint portion of said second case leaving an end face of an extremity of said side walls at an outer side portion of said case, said projecting wall is formed at a location of each of those of said side walls of said second case which correspond to the two major sides of the rectangular shape, and a location at which said projecting wall is positioned on the lower wall side is positioned nearer to said lower wall with respect to an end face at an extremity of said side walls remaining on said first case in a state that said joint portions of said first and second case join with each other with said joining thin wall inserted in said joining recess.

8. The battery according to claim 1, wherein said case has a form of a flattened rectangular plate, said first case has a rectangular lower wall facing one face of said battery cell in the thicknesswise direction and side walls extending perpendicularly from the four sides of said lower wall, said second case has a rectangular upper wall facing the other face of said battery cell in the thicknesswise direction and side faces extending perpendicularly from the four sides of said upper wall, said joint portions of said first and second cases are formed from extremities of said side walls, said joining thin wall is formed at an inner side portion of said case at a location of the joint portion of said first case leaving an end face at an extremity of said side walls at an outer side portion of said case, said joining recess is formed at an inner side portion of said case at a location of the joint portion of said second case leaving an end face of an extremity of said side walls at an outer side portion of said case, said projecting wall is formed at a location of each of those of said side walls of said second case which correspond to the two major sides of the rectangular shape, an end face which remains at an extremity of said side walls of said first case and an end face which remains at an extremity of said side walls of said second case are spaced from each other in the thicknesswise direction in a state that said joint portions of said first and second case joint with and are welded to each other with said joining thin wall inserted in said joining recess, and a location at which said projecting wall is positioned on the lower wall side is positioned nearer to said lower wall than an end face at an extremity of said side walls remaining on said first case.

* * * * *